(12) United States Patent
Tanahashi et al.

(10) Patent No.: US 10,270,479 B2
(45) Date of Patent: Apr. 23, 2019

(54) SIGNAL PROCESSING DEVICE

(71) Applicant: KABUSHIKI KAISHA TOSHIBA, Tokyo (JP)

(72) Inventors: Makoto Tanahashi, Shinagawa Tokyo (JP); Yoshimasa Egashira, Kawasaki Kanagawa (JP); Keiichi Yamaguchi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/689,593

(22) Filed: Aug. 29, 2017

(65) Prior Publication Data

US 2018/0269910 A1  Sep. 20, 2018

(30) Foreign Application Priority Data

Mar. 17, 2017  (JP) .................................. 2017-053653

(51) Int. Cl.
  *H04B 1/62* (2006.01)
  *H04B 1/04* (2006.01)
  *H04L 27/26* (2006.01)

(52) U.S. Cl.
  CPC ....... *H04B 1/0475* (2013.01); *H04L 27/2618* (2013.01); *H04B 2001/045* (2013.01); *H04L 27/2626* (2013.01)

(58) Field of Classification Search
  CPC ............ H04B 1/0475; H04B 2001/045; H04B 2201/70706; H04L 27/2618; H04L 27/2626

USPC ................................ 375/259, 260, 285, 295
  See application file for complete search history.

(56) References Cited

U.S. PATENT DOCUMENTS

| | | | |
|---|---|---|---|
| 5,490,172 A | | 2/1996 | Komara |
| 7,342,978 B2* | | 3/2008 | Feng .................. H04L 27/2621 |
| | | | 370/210 |
| 2002/0142739 A1 | | 10/2002 | Smith |
| 2008/0130767 A1* | | 6/2008 | Lozhkin ............... H03G 11/008 |
| | | | 375/260 |

(Continued)

FOREIGN PATENT DOCUMENTS

| | | |
|---|---|---|
| JP | 2002-314496 | 10/2002 |
| JP | 5339102 | 8/2013 |

*Primary Examiner* — Siu M Lee
(74) *Attorney, Agent, or Firm* — Nixon & Vanderhye, P.C.

(57) ABSTRACT

A signal processing device capable of performing a process of reducing peak power without interfering with a transmission signal at a high speed is provided. A signal processing device includes a peak-reduced signal generating device and a band pass filter. The peak-reduced signal generating device divides an input signal having an information component into signal streams for every predetermined number of signals, and generates peak-reduced signal with peak canceling signals on the basis of the signal streams. The peak-reduced signal generating device combines the signal streams which the peak-reduced signals on the basis of an order in which the division into the signal streams has been performed. The band pass filter passes a frequency component corresponding to the information component and rejects a frequency component corresponding to the peak canceling signal with respect to a signal based on a signal from the peak-reduced signal generating device.

9 Claims, 15 Drawing Sheets

(56) References Cited

U.S. PATENT DOCUMENTS

2010/0158083 A1* 6/2010 Morris .................. H03F 1/3241
375/219

* cited by examiner

SIGNAL PROCESSING DEVICE

CROSS-REFERENCE TO RELATED APPLICATION

This application is based upon and claims the benefit of priority from Japanese Patent Application No. 2017-053653 filed Mar. 17, 2017; the entire contents of which are incorporated herein by reference.

BACKGROUND OF THE INVENTION

Field of the Invention

An embodiment of the present invention relates to a signal processing device.

Description of Related Art

In recent years, orthogonal frequency division multiplexing (OFDM), which is a modulation scheme widely adopted in digital communication and digital broadcasting, has been known to increase a ratio of peak power to average power (hereinafter referred to as a peak-to-average power ratio (PAPR)). A signal with a high PAPR is a factor that hinders the efficiency of a power amplifier (PA). Thus, various methods of reducing the PAPR have been devised.

However, the addition of a peak canceling signal that reduces the PAPR to a transmission signal may interfere with the transmission signal. Also, if an attempt is made to prevent the peak canceling signal from interfering with the transmission signal, it is necessary to cause a signal section in which the peak canceling signal is added to the transmission signal to coincide with a signal section corresponding to one OFDM symbol. However, in the case of a communication system in terrestrial digital broadcasting or the like, the number of corresponding peak canceling signals is enormous because the number of signals corresponding to one OFDM symbol is an enormous number of 8 k to 32 k. Thus, not only a large storage area for storing the peak canceling signals is required, but also a process of adding an enormous number of peak canceling signals to the transmission signal is performed, so that there is a problem in that a large delay is caused in signal processing.

PATENT DOCUMENTS

[Patent Document 1] Japanese Patent No. 5339102

SUMMARY OF THE INVENTION

An objective of the present invention is to provide a signal processing device capable of performing a process of reducing peak power without interfering with a transmission signal at a high speed.

A signal processing device of an embodiment includes a peak-reduced signal generating device and a band pass filter. The peak-reduced signal generating device divides an input signal having an information component into signal streams for every predetermined number of signals. The peak-reduced signal generating device generates peak-reduced signal by using peak canceling signals on the basis of the signal streams obtained through the division. The peak-reduced signal generating device combines the signal streams which the peak-reduced signals on the basis of an order in which the division into the signal streams has been performed. The band pass filter passes a frequency component corresponding to the information component and rejects a frequency component corresponding to the peak canceling signal with respect to a signal based on a signal from the peak-reduced signal generating device.

DETAILED DESCRIPTION OF THE INVENTION

Hereinafter, a signal processing device 2 of an embodiment will be described with reference to the drawings.

First Embodiment

Figure 1:
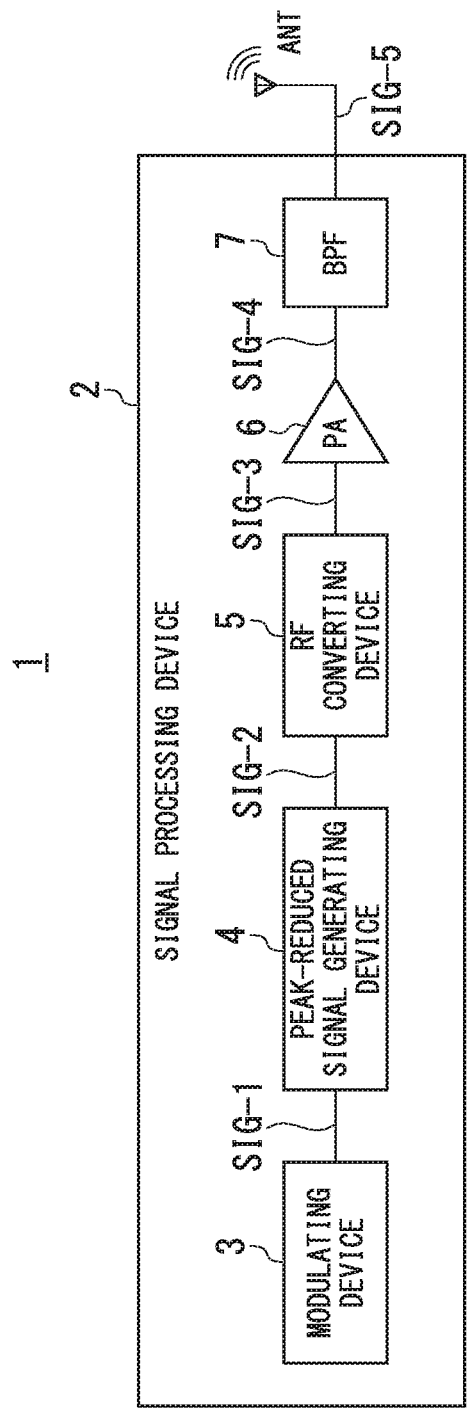
FIG. 1 is a configuration diagram of a transmitter used by a signal processing device according to a first embodiment.

First, the first embodiment will be described. FIG. 1 is a configuration diagram illustrating the signal processing device 2 of a transmitter 1 according to the first embodiment. As illustrated in FIG. 1, the transmitter 1 includes the signal processing device 2 and an antenna ANT. The signal processing device 2 generates a transmission signal to be transmitted by the transmitter 1 and outputs the generated transmission signal to the antenna ANT. The antenna ANT transmits the transmission signal supplied from the signal processing device 2 to an external device. The external device is, for example, a digital broadcast receiver. That is, the transmitter 1 is used for an application such as transmission of video signals used for terrestrial digital broadcasting.

The signal processing device 2 includes a modulating device 3, a peak-reduced signal generating device 4, a radio frequency (RF) converting device 5, a PA device 6, and a band pass filter (BPF) device 7.

The modulating device 3 modulates an information signal using a modulation scheme based on OFDM. Here, the information signal refers to a digital signal obtained by encoding any information. Also, OFDM is a modulation scheme of performing modulation based on a plurality of carriers whose information signal (symbols) are orthogonal each other for each information signal (symbol). In OFDM, there is an example of a "frequency multiplexed signal." Although an example in which the modulating device 3 modulates the information signal will be described, the present invention is not limited thereto. The modulation scheme performed by the modulating device 3 may be another modulation scheme such as a phase modulation scheme or an amplitude modulation scheme. The modulating device 3 outputs a modulated signal (a modulated signal SIG-1) to the peak-reduced signal generating device 4.

Figure 2:
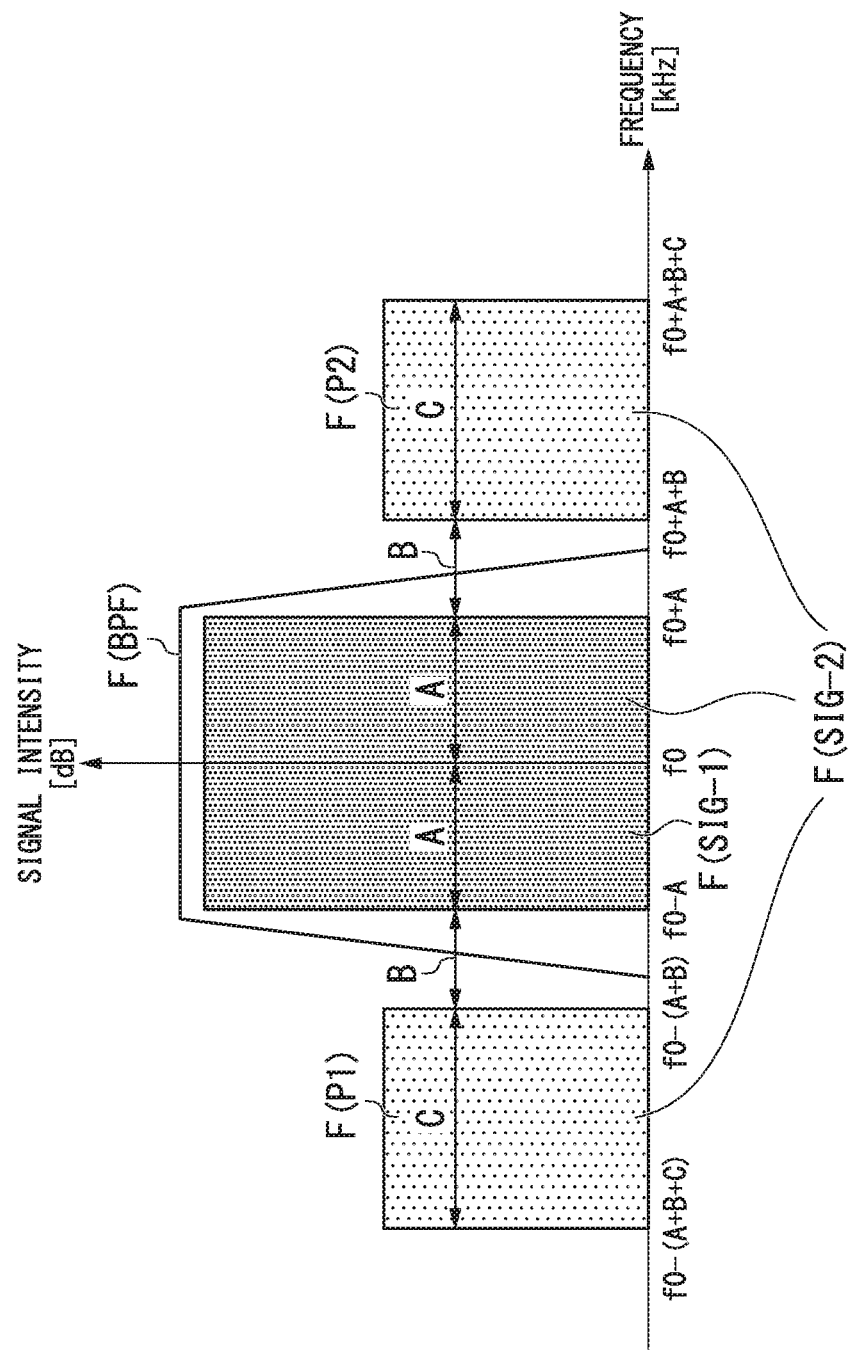
FIG. 2 is an image diagram illustrating frequency characteristics of a modulated signal and a peak canceling signal according to the first embodiment.
Figure 3:
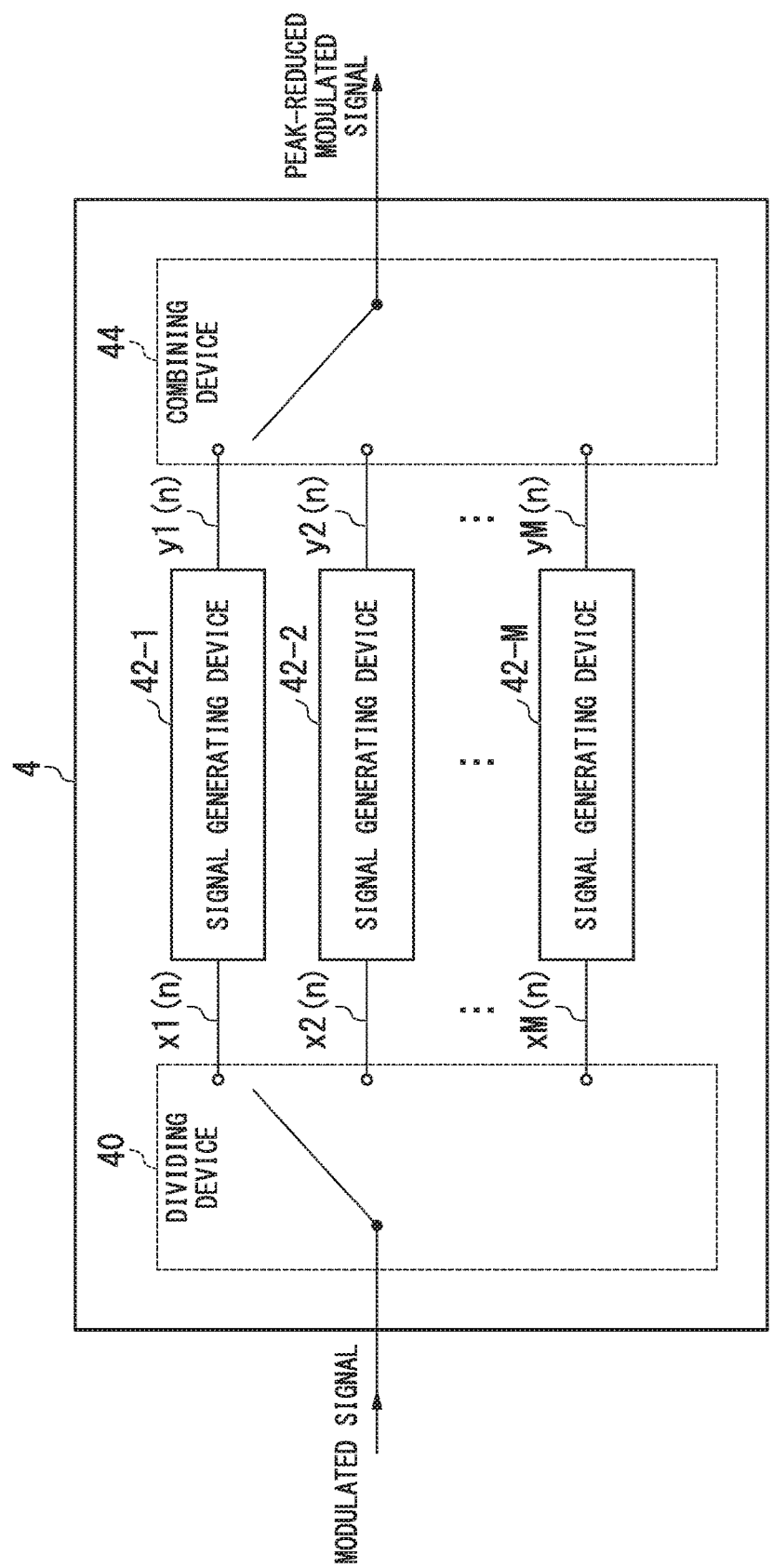
FIG. 3 is a configuration diagram of a peak-reduced signal generating device according to the first embodiment.
Figure 4:
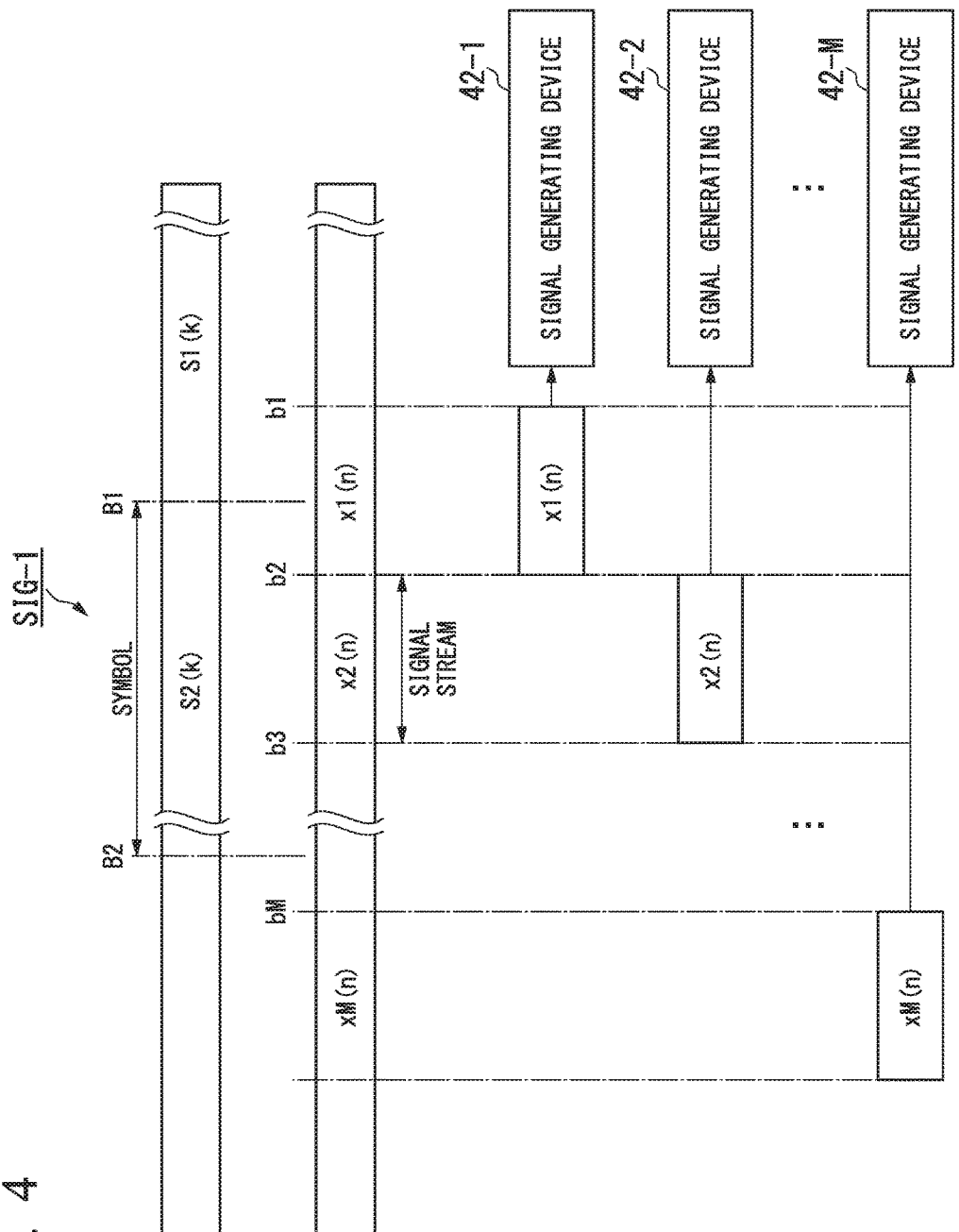
FIG. 4 is a diagram illustrating a signal stream generated by the peak-reduced signal generating device according to the first embodiment.

The peak-reduced signal generating device 4 will be described with reference to FIGS. 2 to 4. FIG. 2 is an image diagram of frequency characteristics of the modulated signal SIG-1 and the peak canceling signal. In FIG. 2, the horizontal axis represents frequency and the vertical axis represents signal intensity. FIG. 3 is a configuration diagram of the peak-reduced signal generating device 4. FIG. 4 is a diagram illustrating a signal stream used in the peak-reduced signal generating device 4.

First, with reference to FIG. 2, a frequency of a peak canceling signal used by the peak-reduced signal generating device 4 will be described. As illustrated in FIG. 2, the modulated signal SIG-1 is a signal having a frequency component of f0±A [kHz] shown in a frequency band F(SIG-1). That is, the modulated signal SIG-1 is a signal having a center frequency of f0 [kHz] and a frequency bandwidth of A [kHz]. On the other hand, the peak canceling signal is a signal having a frequency component between fc−(A+B+C) [kHz] and fc−(A+B) [kHz] shown in a frequency band F(P1) and a frequency component between fc+(A+B) [kHz] and fc+(A+B+C) [kHz] shown in a frequency band F(P2). Also, the peak-reduced signal generating device 4 generates peak-reduced signal by using the peak canceling signal to the modulated signal SIG-1 from the modulating device 3. Thus, as shown in a frequency band F(SIG-2), a peak-reduced modulated signal SIG-2 output from the peak-reduced signal generating device 4 serves as a signal having the frequency band F(SIG-1) of the modulated signal SIG-1 and the frequency band F(P1) and the frequency band F(P2) of the peak canceling signal. In this manner, the peak canceling signal is constituted of a signal having a frequency different from that of the frequency component of the modulated signal SIG-1. In a baseband signal before RF conversion, the center frequency f0 is 0 [Hz].

Next, the configuration of the peak-reduced signal generating device 4 will be described with reference to FIGS. 3 and 4. As illustrated in FIG. 3, the peak-reduced signal generating device 4 includes a dividing device 40, a signal generating unit 42 (signal generating units 42-1 to 42-M (M is a natural number)), and a combining device 44.

As illustrated in FIG. 3, the dividing device 40 divides the modulated signal SIG-1 into signal streams x(n) (signal streams x1(n) to xM(n), where n is a natural number between 1 and N) for every predetermined number of signals (every predetermined number of samples) N. In other words, the dividing device 40 parallelizes the modulated signal SIG-1 from the modulating device 3 for every number of samples N. The dividing device 40 outputs the signal streams x1(n) to xM(n) obtained through the division to the signal generating units 42-1 to 42-M. The number of samples N is, for example, 128. A signal stream x(n) will be described below with reference to FIG. 4.

The signal generating unit 42 generates peak-reduced signal by using peak canceling signals to the signal streams x(n) from the dividing device 40. The signal generating unit 42 reduces PAPRs of the signal streams x(n) by using the peak canceling signals to the signal streams x(n). The signal generating unit 42 outputs reduced signal streams y(n) (reduced signal streams y1(n), y2(n), . . . , yM(n)) with reduced PAPRs to the combining device 44. Also, a process in which the signal generating unit 42 generates peak-reduced signal by using the peak canceling signals (hereinafter simply referred to as an "generating process") will be described in delatter half below.

The combining device 44 combines the reduced signal streams y(n) from the signal generating unit 42 on the basis of an order in which the dividing device 40 has performed the division into the signal streams x(n). Specifically, the combining device 44 combines the reduced signal streams y(n) in the order in which the division into the signal streams x(n) has been performed. More specifically, the combining device 44 combines the reduced signal streams y(n) in the order of the reduced signal stream y1(n), the reduced signal stream y2(n), . . . , and the reduced signal stream yM(n). The reduced signal streams y(n) combined by the combining device 44 is a signal group with a reduced PAPR. Thus, a signal output from the combining device 44 is a modulated signal whose PAPR is reduced as compared with the modulated signal SIG-1. The combining device 44 outputs the modulated signal (peak-reduced modulated signal SIG-2) with the reduced PAPR to the RF converting device 5.

In this manner, the dividing device 40 of the peak-reduced signal generating device 4 divides the modulated signal SIG-1 from the modulating device 3 into the signal streams x(n) for every predetermined number of signals N. Also, the signal generating unit 42 of the peak-reduced signal generating device 4 generates peak-reduced signal by using peak canceling signals to the signal streams x(n) obtained through the division. Also, the combining device 44 combines the reduced signal streams y(n) (the peak-reduced signals are generated by the signal generating unit 42 in an order of division.

Here, the signal stream x(n) will be described with reference to FIG. 4. As illustrated in FIG. 4, the modulated signal SIG-1 includes a plurality of symbols S(k) (symbols S1(k), S2(k), . . . ). Here, k denotes a sample number indicating an order of a signal in a sequence among K signals which are a total number of samples for one OFDM symbol. The total number of samples K for one OFDM symbol is expressed by the following Equation (1). Here, fs denotes a processing rate (sampling frequency) of the modulating device 3 and T denotes a time length corresponding to one OFDM symbol.

$$K = fs \times T \quad (1)$$

For example, in the case of terrestrial digital broadcasting, the processing rate fs is 65 [MHz] and the time length T corresponding to one OFDM symbol is 1 [ms]. In this case, the total number of samples K for one OFDM symbol calculated by substituting the processing rate fs and the time length T into the above-described Equation (1) is 65,000. That is, the modulated signal SIG-1 output from the modulating device 3 expresses the information of one symbol with 65,000 signals. In the example of FIG. 3, each symbol of symbols S1(k), S2(k), . . . has 65,000 signals.

On the other hand, the dividing device 40 divides the modulated signal SIG-1 into signal streams x(n) for every number of samples N (for example, 128). In the present embodiment, it is only necessary for the dividing device 40 to divide the modulated signal SIG-1 into groups of signals (for example, 128) grouped to such an extent that a high PAPR portion can be detected. The number of samples N may be a value sufficiently smaller than the total number of samples K for one OFDM symbol.

Also, when the modulated signal SIG-1 is divided, the dividing device 40 may perform division at a timing unrelated to boundaries B (B1 to BN) of the modulated signal SIG-1. That is, in the example of FIG. 4, boundaries B (B1, B2, . . . ) of symbols S(k) do not necessarily overlap with boundaries b (b1 to bM) of the signal streams x(n). That is, the symbol timing of the modulated signal SIG-1 and the timing of division performed by the dividing device 40 may be asynchronous.

Returning to FIG. 1, the RF converting device 5 performs RF conversion on the peak-reduced modulated signal SIG-2 from the peak-reduced signal generating device 4 with a carrier frequency corresponding to a frequency transmitted by the transmitter 1. The RF converting device 5 outputs the signal obtained through the RF conversion (an RF conversion signal SIG-3) to the PA device 6. The PA device 6 amplifies the RF conversion signal SIG-3 from the RF converting device 5 to a signal amplitude corresponding to the transmission output. The PA device 6 outputs the amplified signal (an amplified signal SIG-4) to the BPF device 7.

The BPF device 7 includes a band pass filter for passing a signal component having a specific frequency band with respect to the input signal. Specifically, as shown in frequency characteristics F(BPF) of FIG. 4, the BPF device 7 passes a frequency band F(SIG-1). Also, the BPF device 7 rejects frequency bands F(P1) and F(P2). That is, the BPF device 7 passes the frequency band F(SIG-1) corresponding to the modulated signal and rejects the frequency bands F(P1) and (P2) corresponding to the peak canceling signal with respect to an amplified signal SIG-4 from the PA device 6. In the signal after the RF conversion, the center frequency f0 is a carrier frequency.

The BPF device 7 outputs a signal (a transmission signal SIG-5) after passing through the filter to the antenna ANT.

(Concerning Generating Process in which Signal Generating Unit 42 Generates Peak-Reduced Signal by Using Peak Canceling Signal)

Figure 5:
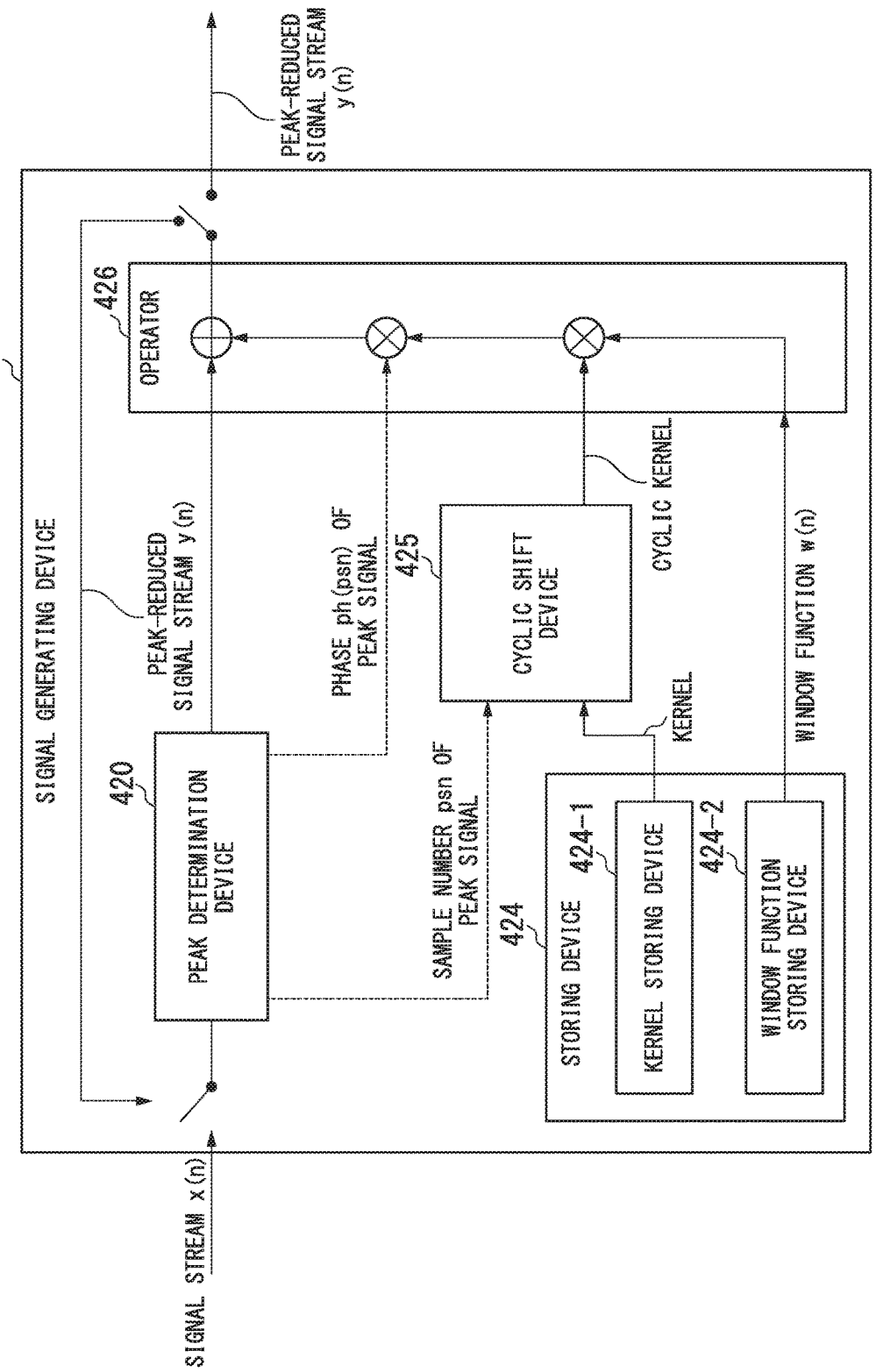
FIG. 5 is a configuration diagram of a signal generating unit according to the first embodiment.

Here, the generating process performed by the signal generating unit 42 will be described with reference to FIG. 5. FIG. 5 is a configuration diagram illustrating the configuration of the signal generating unit 42. As illustrated in FIG. 5, the signal generating unit 42 includes a peak determination device 420, a storing device 424, a cyclic shift device 425, and an operator 426.

The peak determination device 420 determines a peak signal x(psn) having a maximum signal amplitude in the signal stream x(n) from the dividing device 40. The peak determination device 420 determines the peak signal x(psn) by comparing amplitudes of N signals included in the signal stream x(n).

Also, the peak determination device 420 acquires an amplitude lv(psn) in the found peak signal x(psn). If the acquired amplitude lv(psn) is greater than a skip level Slv, the peak determination device 420 outputs a sample number psn of the peak signal x(psn) to the cyclic shift device 425.

Also, if the acquired amplitude lv(psn) is greater than the skip level Slv, the peak determination device 420 outputs a phase ph(psn) in the peak signal x(psn) to the operator 426.

On the other hand, if the acquired amplitude lv(psn) is less than the skip level Slv, the peak determination device 420 outputs the signal streams x(n) to the combining device 44 via the operator 426. That is, if the amplitude lv(psn) is less than the skip level Slv, the peak determination device 420 does not output the sample number psn to the cyclic shift device 425 and does not output the phase ph(psn) to the operator 426. That is, if the amplitude lv(psn) is less than the skip level Slv, the signal generating unit 42 does not perform a process of reducing the peak signal of the signal stream x(n). Thereby, it is possible to reduce the number of times that the peak canceling signal is used and reduce the signal intensity of a frequency outside a band different from that of a frequency component of the modulated signal SIG-1, as compared with a case in which the peak canceling signal is always used the signal stream x(n).

As illustrated in FIG. 5, the storing device 424 includes a kernel storing device 424-1 and a window function storing device 424-2. The kernel storing device 424-1 stores a kernel p(n) generated with a signal having a frequency different from that of the frequency component of the modulated signal SIG-1. The window function storing device 424-2 stores a window function w(n). Hereinafter, the kernel p(n) and the window function w(n) will be described in order.

(Concerning Kernel p(n))

Figure 6:
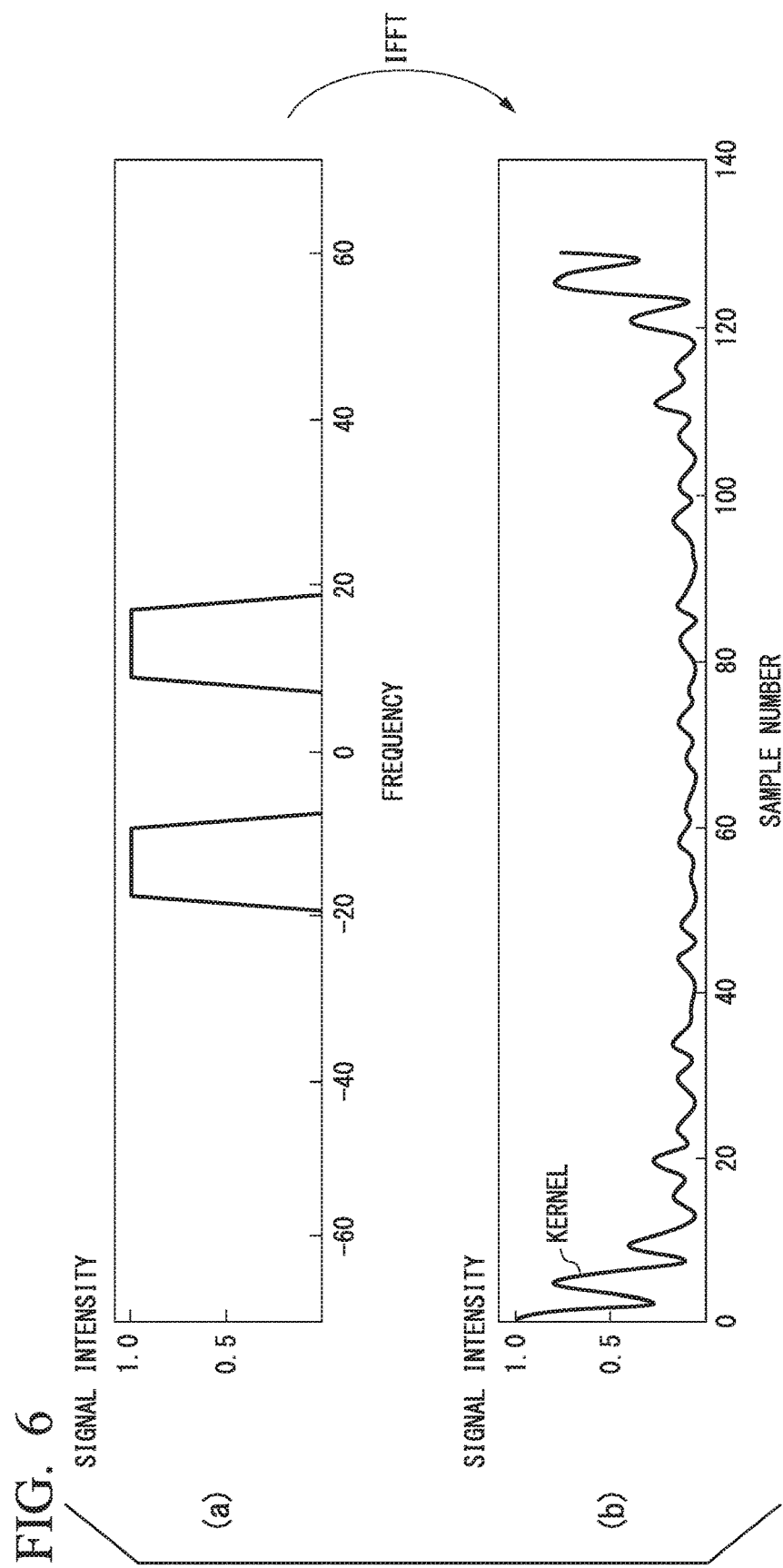
FIG. 6 is a diagram illustrating a kernel according to the first embodiment.

First, the kernel p(n) will be described with reference to FIG. 6. FIG. 6 is a diagram illustrating the kernel p(n). FIG. 6(a) is a diagram illustrating an example of frequency characteristics of the kernel p(n). In FIG. 6(a), the horizontal axis represents a frequency and the vertical axis represents a signal intensity. FIG. 6(b) is a diagram illustrating an example of the kernel p(n) generated on the basis of the frequency characteristics shown in FIG. 6(a). In FIG. 6(b), the horizontal axis represents a sample number and the vertical axis represents an absolute value of signal amplitude.

The kernel p(n) is a time-series signal having a predetermined frequency band. The kernel p(n) is generated by performing an inverse FFT (IFFT) on preset predetermined frequency characteristics. In the example illustrated in FIG. 6(a), the signal intensity of a frequency corresponding to a frequency between 9 and 18 is set to 1.0 in the kernel p(n). In the example illustrated in FIG. 6(b), a waveform in which the amplitude is gradually attenuated for the sample number n between 1 and 20 and 4 rotations are performed, that is, 20 samples correspond to 4 cycles is shown. This waveform corresponds to a signal having a corresponding frequency between 9 and 18 illustrated in FIG. 6(a). For example, if the sampling frequency of the kernel p(n) is about 50 [kHz], a signal corresponding to 4 cycles in 20 samples, that is, corresponding to 1 cycle in 5 samples is a signal having a frequency of about 10 [kHz].

(Concerning Window Function w(n))

Next, the window function w(n) will be described. The window function w(n) is a function used to adjust the amplitude of a signal group such as the kernel p(n). Specifically, the window function w(n) is a function for drawing a peak curve along which amplitudes of first half and latter half portions are gradually attenuated (see FIGS. 8(b) and 8(c)). By multiplying the signal of the kernel p(n) or the like by the window function w(n), the amplitude of the signal group is adjusted along the curve drawn by the window function w(n). By multiplying the signal group such as the kernel p(n) by the window function w(n), the first half and latter half portions of the signal group can be smoothly attenuated, a boundary between signal groups can be smoothly connected, and spreading of the frequency spectrum can be suppressed. A Gaussian window, a Hanning window, a Blackman window, a Kaiser window, etc. are known as a well-known window function w(n), and any window function may be used. Here, as an example, the Gaussian window is used for the window function w(n).

The cyclic shift device 425 cyclically shifts the kernel p(n) stored in the storing device 424 on the basis of the sample number psn (an example of the "position of the peak power") found by the peak determination device 420.

Figure 7:
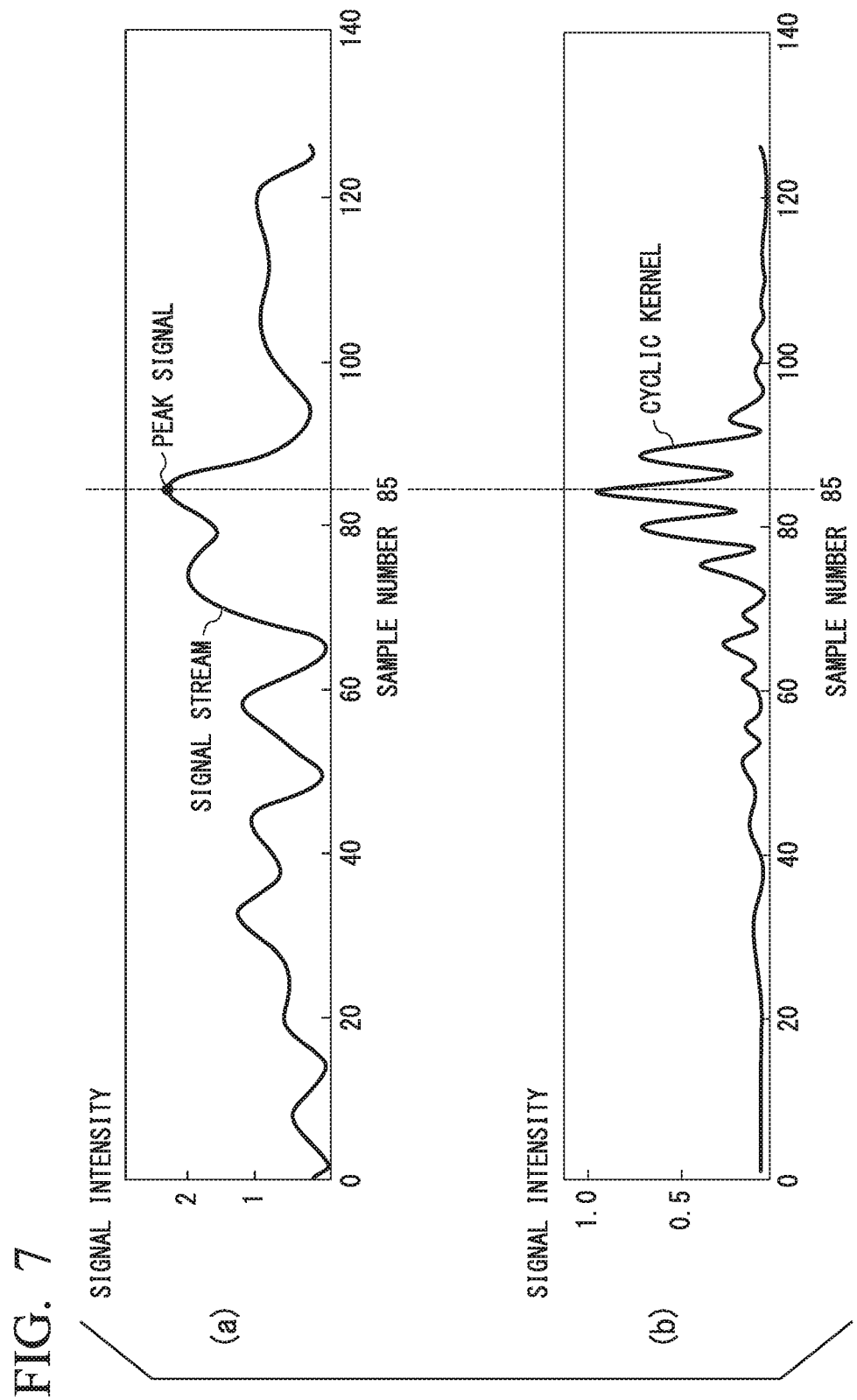
FIG. 7 is a diagram illustrating a cyclic kernel according to the first embodiment.

Here, a cyclic shift performed by the cyclic shift device 425 will be described with reference to FIG. 7. FIG. 7 is a diagram illustrating a cyclically shifted kernel (hereinafter referred to as a "cyclic kernel"). FIG. 7(*a*) illustrates an example of the signal stream x(n). In FIG. 7(*a*), the horizontal axis represents a sample number and the vertical axis represents an absolute value of signal amplitude. FIG. 7(*b*) illustrates an example of a cyclic kernel corresponding to the signal stream x(n) illustrated in FIG. 7(*a*). In FIG. 7(*b*), the horizontal axis represents a sample number and the vertical axis represents an absolute value of signal amplitude.

A signal indicating a sample number psn is input from the peak determination device 420 to the cyclic shift device 425. The cyclic shift device 425 shifts a kernel p(n) so that a signal having the maximum amplitude of the kernel p(n) is located at a position which is the same as that of the sample number psn from the peak determination device 420. Specifically, if the sample number psn of the peak signal x(psn) of the signal stream x(n) is 85 as illustrated in FIG. 7(*a*), the cyclic shift device 425 moves the signal having the maximum amplitude in the kernel p(n) so that the signal is located at a position of the sample number 85 while keeping the shape of the waveform of the kernel p(n) as illustrated in FIG. 7(*b*). That is, p(1) is moved to p(85) and p(2) is moved to p(86). Also, p(128) is moved to p(84) and p(127) is moved to p(83) so that a signal p(128) of the latter half of the kernel is located before a signal p(1) of the first half thereof. Such a cyclic kernel p(nsft) is shown in the following Equation (2). Here, n denotes a sample number of the kernel, snp denotes a sample number of the peak signal, mod denotes a remainder operator, and N denotes the total number of samples of the kernel.

$$p(nsft) = p((n-snp), \mod N) \quad (2)$$

The operator 426 adds a peak canceling signal, which is obtained by multiplying the cyclic kernel p(nsft) from the cyclic shift device 425 by the window function w(n), to the signal stream x(n).

Figure 8:
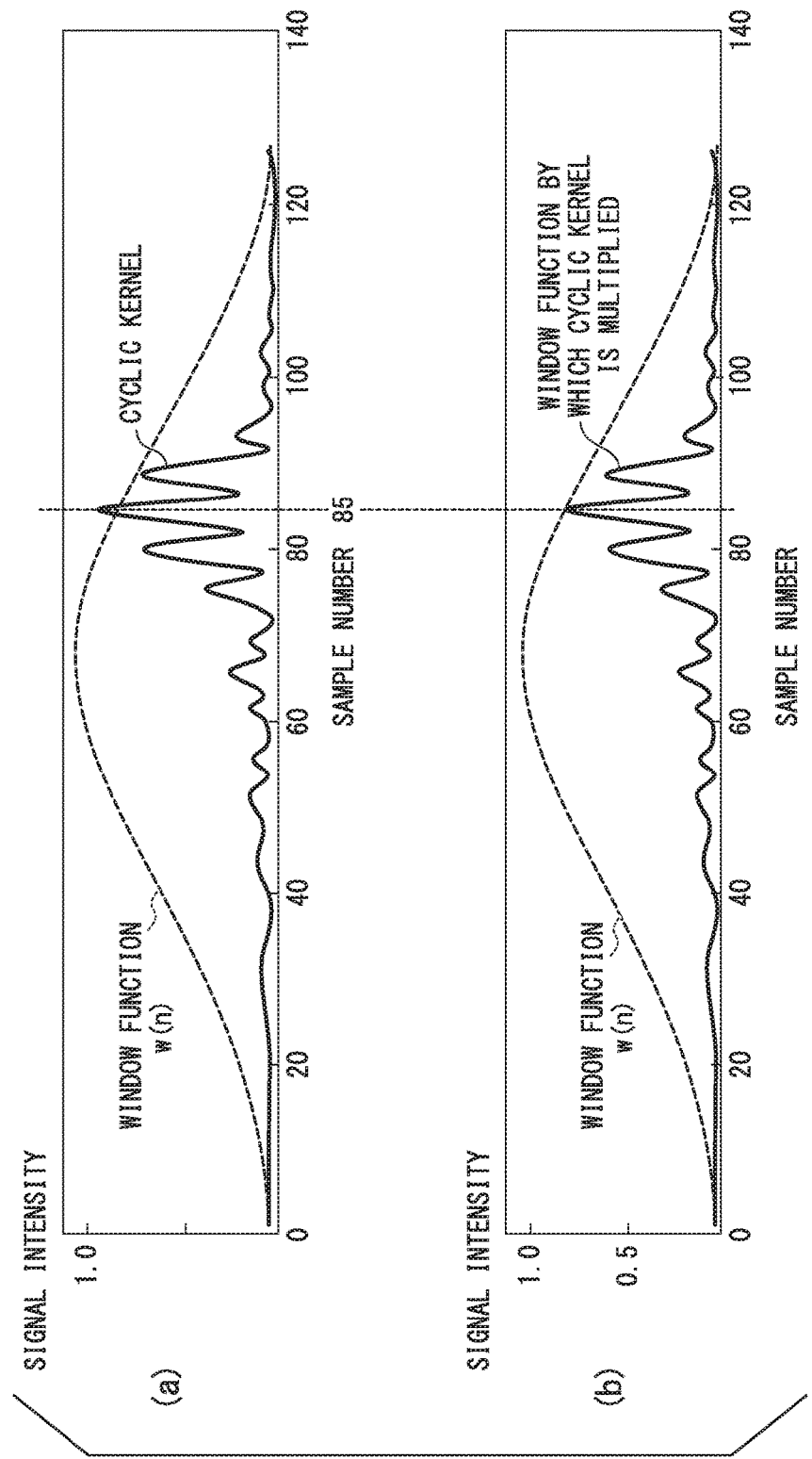
FIG. 8 is a diagram illustrating a cyclic kernel which is multiplied by a window function according to the first embodiment.

A process performed by the operator 426 will be described with reference to FIG. 8. FIG. 8 is a diagram illustrating a peak canceling signal. FIG. 8(*a*) illustrates a cyclic kernel p(nsft) before being multiplied by the window function w(n) and the window function w(n). In FIG. 8(*a*), the horizontal axis represents a sample number and the vertical axis represents an absolute value of signal amplitude. FIG. 8(*b*) illustrates a cyclic kernel p(nsft) after being multiplied by a window function w(n) and the window function w(n). In FIG. 8(*b*), the horizontal axis represents a sample number and the vertical axis represents an absolute value of signal amplitude.

As illustrated in FIG. 8(*a*), in the cyclic kernel p(nsft), an absolute value of the amplitude at p(85) is a maximum (here, 1). Also, the window function w(n) is w(64) and the absolute value of the amplitude is a maximum (here, 1). In the sample number 85, a value of the kernel p(85) exceeds a value of the window function w(85).

On the other hand, as illustrated in FIG. 8 (*b*), if the operator 426 multiplies the cyclic kernel p(nsft) by the window function w(n), the amplitude of the cyclic kernel p(nsft) is adjusted and a value of the kernel p(85) is equal to a value of the window function w(85) in the sample number 85.

Also, the operator 426 adjusts a phase of the cyclic kernel p(nsft) on the basis of a phase ph(psn) of a peak signal x(psn). Specifically, the operator 426 acquires a phase of the peak signal x(psn) from the peak determination device 420. Then, a portion corresponding to the peak signal x(psn) in the cyclic kernel p(nsft) is adjusted so that its phase is the same as the phase ph(psn) of the peak signal x(psn). That is, the operator 426 causes a signal of the cyclic kernel p(nsft) having the same phase as the peak signal x(psn) to correspond to the peak signal x(psn). Thereby, if the cyclic kernel p(nsft) is used the peak signal x(psn), that is, if the cyclic kernel p(nsft) is subtracted from the peak signal x(psn), the amplitude of the peak signal x(psn) is reduced.

Also, the operator 426 multiplies the cyclic kernel p(nsft) by a predetermined peak reduction coefficient α that is defined in advance. The peak reduction coefficient α is a variable for adjusting an extent to which the peak is reduced at the maximum in one generating process. The peak reduction coefficient α is, for example, 0.5.

In this manner, the operator 426 adjusts the phase of the peak canceling signal obtained by multiplying the cyclic kernel p(nsft) from the cyclic shift device 425 by the window function w(n), and adjusts the amplitude according to the peak reduction coefficient α and then uses the adjusted amplitude to the signal stream x(n).

The process performed by the operator 426 is shown in the following Equation (3). Here, y(n) denotes a signal stream after the generating process, x(n) denotes a signal stream before the generating process, a denotes a peak reduction coefficient, ph(psn) denotes a phase of the peak signal, p((n−snp), mod N) denotes a cyclic kernel shown in the above-described Equation (2), and w(n) denotes a window function.

$$y(n) = x(n) - \alpha \times \text{ph}(psn) \times p((n-snp), \mod N) \times w(n) \quad (3)$$

Also, the signal generating unit 42 iterates the above-described generating process a predetermined number of times. Even if the signal amplitude of the peak signal x(psn) is attenuated at the sample number (peak position) psn of the peak signal x(psn) in one generating process performed by the operator 426, the amplitude of the signal around the peak signal x(psn) may increase. By iterating the generating process a predetermined number of times, the signal generating unit 42 reduces the peak of the signal amplitude in the entire signal stream x(n).

Figure 9:
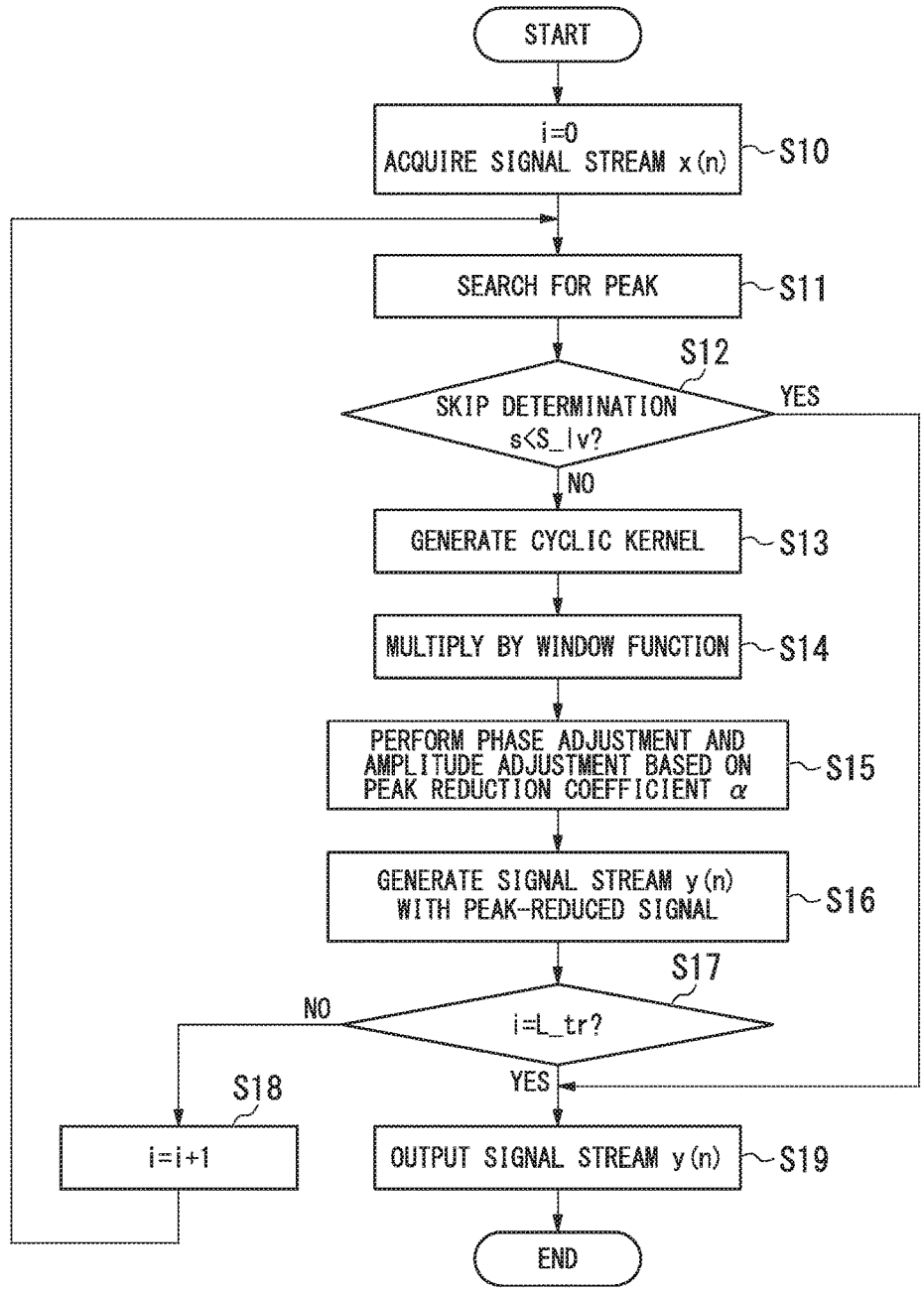
FIG. 9 is a flowchart illustrating a flow of a process performed by the signal generating unit according to the first embodiment.

Here, the flow of the generating process performed by the signal generating unit 42 will be described with reference to FIG. 9. FIG. 9 is a flowchart illustrating a flow of a process performed by the signal generating unit 42. First, as a precondition that the signal generating unit 42 performs a process, variables (a skip level Slv, a peak reduction coefficient α, and the number of iterations Ltr) necessary for processing are pre-stored in the storing device 424.

When the process is performed, the signal generating unit 42 first initializes an iteration counter i. Also, the peak determination device 420 acquires a signal stream x(n) (step S10).

The peak determination device 420 acquires a peak signal x(psn) in the acquired signal stream x(n). The peak determination device 420 acquires a sample number psn, an amplitude lv(psn), and a phase ph(psn) of the acquired peak signal x(psn) (step S11). The peak determination device 420 compares the acquired amplitude lv(psn) with the skip level Slv (step S12). Then, if the amplitude lv(psn) is greater than the skip level Slv, the peak determination device 420 outputs the sample number psn to the cyclic shift device 425. The cyclic shift device 425 generates a cyclic kernel p(nsft) corresponding to the sample number psn (step S13). The cyclic shift device 425 outputs the generated cyclic kernel p(nsft) to the operator 426.

The operator 426 multiplies the cyclic kernel p(nsft) from the cyclic shift device 425 by the window function (step S14). Also, the operator 426 adjusts a phase of the cyclic kernel p(nsft) multiplied by the window function and multiplies the cyclic kernel p(nsft) by the peak reduction coefficient α to adjust the amplitude (step S15). The operator 426 generates peak-reduced signal stream x(n) by using the peak canceling signal generated as described above to the signal (step S16).

The signal generating unit 42 compares the iteration counter i with the number of iterations Ltr (step S17). If the iteration counter i is equal to the number of iterations Ltr (step S17, Yes), the signal generating unit 42 outputs the signal stream y(n) obtained by using the peak canceling signal to the signal stream x(n) to the combining device 44 (step S18). On the other hand, if the iteration counter i is different from the number of iterations Ltr (step S17, No), the signal generating unit 42 increments the iteration counter i by 1 (step S19). Then, the signal generating unit 42 inputs the signal stream y(n) to the peak determination device 420, and returns to the processing shown in step S11. A signal stream serving as a target of a generating process in the first generating process is x(n) and a signal stream as a target of a generating process in second and subsequent generating processes is y(n).

As described above, the signal processing device 2 of the first embodiment includes the peak-reduced signal generating device 4 configured to divide a modulated signal SIG-1 (an example of an "input signal having an information component") into signal streams x(n) for every number of samples N (an example of "every predetermined number of signals"), generate peak-reduced signals by using peak canceling signals on the basis of the signal streams x(n) obtained through the division, and combine signal streams y(n) which the peak-reduced signals on the basis of an order in which the division into the signal streams x(n) has been performed; and the BPF device 7 (an example of a "band pass filter") configured to pass a frequency band F(SIG-1) of the modulated signal SIG-1 (an example of a "frequency component corresponding to the information component") and reject frequency bands F(P1) and F(P2) (an example of a "frequency component corresponding to the peak canceling signal") with respect to an RF conversion signal SIG-3 (an example of a "signal based on a signal from the peak-reduced signal generating device") obtained by performing RF conversion on a peak-reduced modulated signal SIG-2 (an example of the "signal from the peak-reduced signal generating device").

Thereby, in the signal processing device 2 of the first embodiment, a peak canceling signal can be used a signal stream of N samples obtained through the division. Because the number of samples N can be set irrespective of the total number of samples K corresponding to one symbol of the modulated signal SIG-1, it is possible to reduce the number of samples N even if the total number of samples K is large and reduce an amount of delay caused by one generating process. Also, a storage capacity for storing the signal stream can be reduced by reducing the number of samples N.

Also, because it is possible not only to reduce the amount of delay caused by one generating process but also to perform a plurality of generating processes in parallel if the signal processing device 2 includes a plurality of signal generating units 42, it is possible to perform the generating process on a plurality of signal streams with a slight amount of delay. Also, because the signal streams after the generation to the peak-reduced signals can be combined in the signal processing device 2, it is possible to generate a signal obtained by reducing the peak power of the modulated signal SIG-1 while keeping an information component included in the modulated signal SIG-1.

Also, because the BPF device 7 can pass the frequency band F(SIG-1) and reject the frequency bands F(P1) and P(2) in the signal processing device 2, it is possible to remove the peak canceling signal while keeping the information component included in the modulated signal SIG-1. That is, even if the peak-reduced signal is generated by using the peak canceling signal, the signal quality of the modulated signal is not degraded. Also, because the transmission signal in which the peak canceling signal is rejected is output (transmitted) to a signal propagation path, leakage of a frequency of the transmission wave to an adjacent channel can be suppressed.

Figure 14:
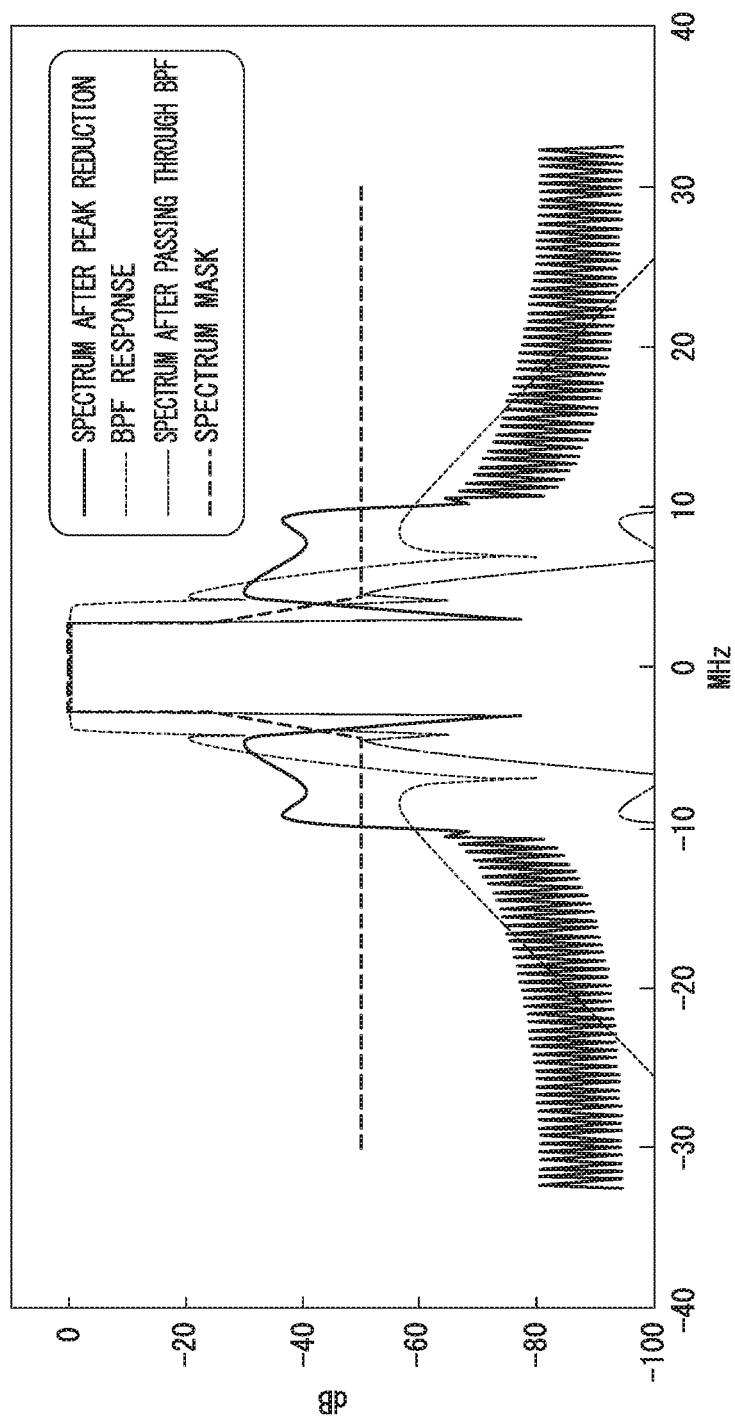
FIG. 14 is a first diagram illustrating advantageous effects of the embodiments.

FIG. 14 is a diagram illustrating frequency characteristics of each signal in the signal processing device 2 of the present embodiment. In FIG. 14, the horizontal axis represents a frequency and the vertical axis represents an absolute value of signal amplitude. As illustrated in FIG. 14, in the frequency characteristics after the peak reduction, a frequency component of a peak canceling signal is a band outside an information signal located in a band of about ±4 [MHz] from a center frequency. Also, the band pass filter characteristics of the BPF device 7 are characterized in that the information signal is passed and the frequency component of the peak canceling signal is rejected. Also, the frequency characteristics after passing through the band pass filter are characterized in that the frequency component after the peak reduction is attenuated as compared with that before passing through the band pass filter. Also, the frequency characteristics after passing through the band pass filter satisfy a spectrum mask that specifies adjacent channel leakage power and the like. As described above, in the signal processing device 2 of the present embodiment, even if a frequency outside a band of an information signal is used in the peak canceling signal, leakage of the frequency of the transmission wave to an adjacent channel can be suppressed.

Also, in the signal processing device 2 of the present embodiment, the BPF device 7 performs band limitation (band pass filtering) on an amplified signal SIG-4 amplified by the PA device 6. Thus, in the signal processing device 2 of the present embodiment, a signal with a reduced PAPR can be input to the PA device 6. That is, because change in the signal amplitude input to the power amplifier of the PA device 6 is suppressed, distortion in an output signal due to a state in which a signal with high signal amplitude cannot be amplified by the power amplifier at a predetermined amplification factor or a saturated state can be suppressed.

In the signal processing device 2 of the first embodiment, the modulated signal SIG-1 is an OFDM signal (an example of a "frequency multiplexed signal"), and the peak-reduced signal generating device 4 divides the modulated signal SIG-1 into signal streams for every predetermined number of samples at a timing asynchronous with a timing for every total number of samples K corresponding to one symbol of the modulated signal SIG-1 (an example of a "timing when frequency multiplexed signals are not orthogonal each other"). Thereby, even when the timing of division is different from the symbol timing of the modulated signal SIG-1, the signal processing device 2 can smoothly connect boundaries of signal streams when signal streams of the peak-reduced signals are combined by multiplying a cyclic kernel by the window function. That is, there is no interference with the information component of the modulated signal SIG-1. Accordingly, in the signal processing device 2 of the first embodiment, it is possible to generate a signal stream regardless of the symbol timing of the modulated signal SIG-1, divide the modulated signal SIG-1 at an arbitrary timing and perform a process without worrying about the symbol timing, that is, without increasing a processing load.

Also, in the signal processing device 2 of the first embodiment, the peak-reduced signal generating device 4 includes the peak determination device 420 configured to determine a peak signal x(psn) (an example of a "position of peak power") in the signal stream x(n); the storing device 424 configured to store a kernel generated from a signal having a frequency different from that of a frequency component of the modulated signal SIG-1 and a window function corresponding to the kernel; the cyclic shift device 425 configured to cyclically shift the kernel on the basis of the position of the peak power found by the peak determination device 420; and the operator 426 configured to add a peak canceling signal obtained by multiplying the kernel cyclically shifted by the cyclic shift device 425 by the window function to the signal stream.

Thereby, in the signal processing device 2 of the first embodiment, because it is possible to generate the cyclic kernel p(nsft) corresponding to the peak signal x(psn) in the signal stream x(n), the signal amplitude of the peak signal x(psn) in the signal stream x(n) can be reduced. Also, because the cyclic kernel p(nsft) can be multiplied by the window function, the amplitudes of the first half and latter half portions of the signal stream after the generation to the peak-reduced signal do not change. Thus, when the signal streams are combined, the boundaries of the signal streams are smoothly connected. Accordingly, an information component of a signal stream after the combining process is not degraded as compared with that of the signal stream before division.

Figure 15:
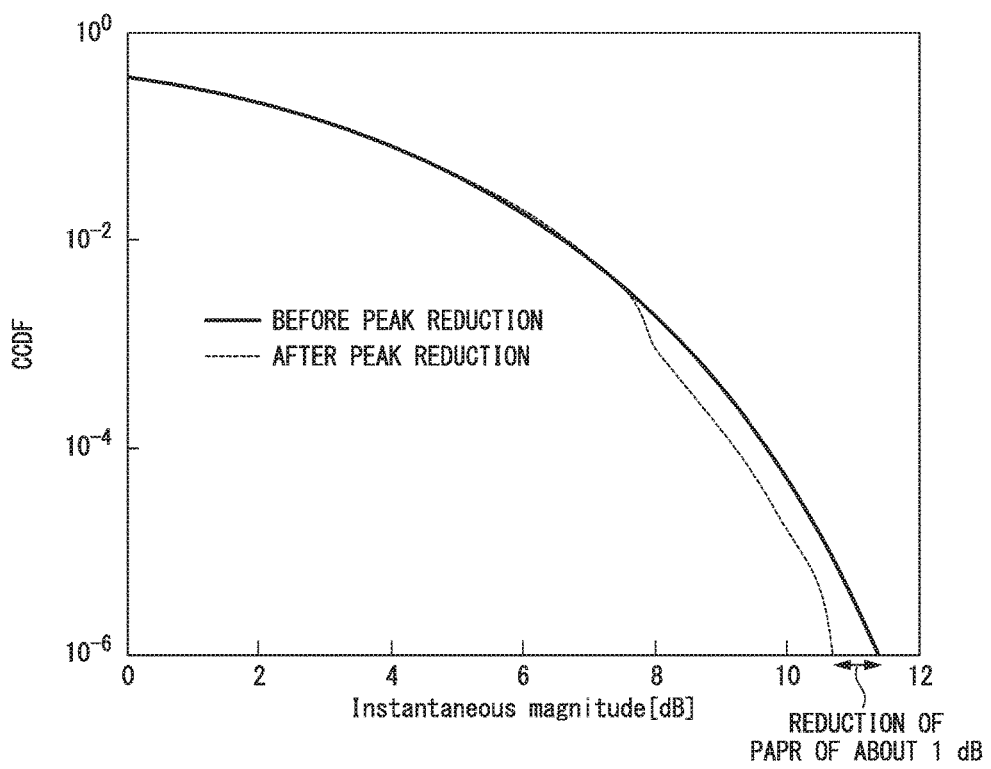
FIG. 15 is a second diagram illustrating advantageous effects of the embodiments.

FIG. 15 is a diagram illustrating the effect of reducing the peak power by the signal processing device 2 of the first embodiment with a complementary cumulative distribution function (CCDF). The vertical axis of FIG. 15 represents a probability that an amplitude higher than that indicated by a value of the corresponding horizontal axis occurs. As a method of quantitatively defining a PAPR, a value on the horizontal axis corresponding to CCDF=$10^{-6}$ may be taken as a PAPR. According to this definition, the signal processing device 2 of the first embodiment can confirm that the PAPR is reduced by about 1 dB. Thus, in the signal processing device 2 of the first embodiment, the PAPR can be reduced.

Second Embodiment

Next, the second embodiment will be described. In the following description, components which are the same as those of the first embodiment are denoted by the same reference signs, and description thereof will be omitted. In the second embodiment, the window function storing device 424-2 stores a plurality of window functions (for example, w(n), w2(n), . . . . Also, in the second embodiment, the operator 426 selects one window function (for example, w2(n)) among the plurality of window functions. The operator 426 selects one window function among the plurality of window functions on the basis of the peak signal x(psn) in the signal stream x(n) found by the peak determination device 420.

Figure 10:
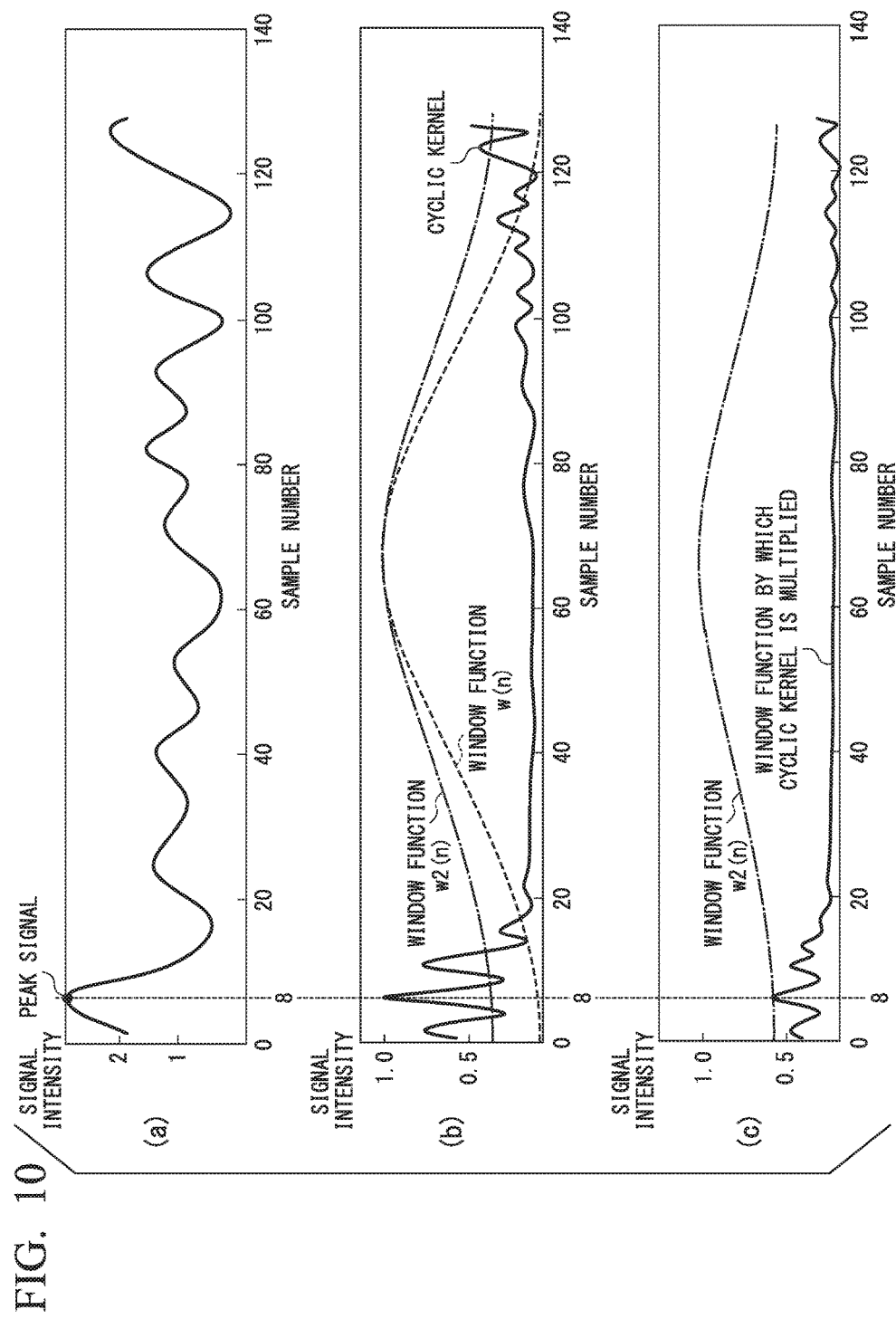
FIG. 10 is a diagram illustrating a second embodiment.

Here, a process of selecting the window function performed by the operator 426 will be described with reference to FIG. 10. FIG. 10 is a diagram illustrating the window function. FIG. 10(a) illustrates an example of a signal stream x(n). In FIG. 10(a), the horizontal axis represents a sample number and the vertical axis represents an absolute value of signal amplitude. FIG. 10(b) illustrates an example of a cyclic kernel p(nsft) corresponding to the signal stream x(n) illustrated in FIG. 7(a) and two window functions w1(n) and w2(n). In FIG. 10(b), the horizontal axis represents a sample number and the vertical axis represents an absolute value of signal amplitude. FIG. 10(c) illustrates a cyclic kernel p(nsft) after the multiplication by a window function w2(n) and the window function w2(n). In FIG. 10(c), the horizontal axis represents a sample number and the vertical axis represents an absolute value of signal amplitude.

As illustrated in FIG. 10(a), if the sample number psn of the peak signal x(psn) of the signal stream x(n) is 8, the sample number psn is closer to a first half portion of a signal than the same number 85 described in the example of the first embodiment. In this case, as illustrated in FIG. 10(b), the cyclic kernel p(nsft) is generated such that the amplitude is maximized in the sample number 8.

If a window function by which the cyclic kernel p(nsft) illustrated in FIG. 10(b) is to be multiplied is set to the window function w(n), the cyclic kernel p(nsft) after the multiplication by the window function w(n) has a signal amplitude of almost 0 at the sample number psn (8) because the window function w(n) has a signal amplitude of 0 (zero) in the first half and latter half portions of the signal. Even if the peak canceling signal generated in this manner is used the signal stream x(n), a degree of reduction in the signal amplitude decreases. Thus, if the sample number psn is close to the first half or latter half portion of the signal in the second embodiment, the operator 426 sets the window function w2(n) as a window function by which the cyclic kernel p(nsft) is to be multiplied. The window function w2(n) is, for example, a function that does not attenuate amplitudes of the first half and latter half portions of the signal compared with the window function w1(n). Accordingly, as illustrated in FIG. 10(c), the signal amplitude of the peak canceling signal generated by multiplying the cyclic kernel p(nsft) by the window function w2(n) is not particularly attenuated in the sample number psn (8) and the peak of the signal stream x(n) is reduced by using the peak canceling signal.

In the second embodiment, the peak determination device 420 outputs an acquired sample number psn to the operator 426. The operator 426 selects one of the plurality of window functions on the basis of the sample number psn from the peak determination device 420. For example, the operator 426 may select the window function w2(n) if the sample number psn is between 1 and 10, select the window function w(n) if the sample number psn is between 11 and 118, and select the window function w2(n) if the sample number psn is between 119 and 128.

Also, in the second embodiment, the storing device 424 may store a plurality of peak reduction coefficients α. In this case, the operator 426 selects the peak reduction coefficient α on the basis of the sample number psn from the peak determination device 420.

The peak reduction coefficient α is a variable for adjusting the amplitude of the cyclic kernel p(nsft) such that it becomes uniform. Thus, for example, if the sample number psn is in the vicinity of the first half of the signal and the signal amplitude of the cyclic kernel p(nsft) which has been multiplied by the window function w2(n) is already attenuated, the operator 426 may set the peak reduction coefficient α to a relatively large value (for example, 1.0).

As described above, in the signal processing device 2 of the second embodiment, the window function storing device 424-2 (an example of a storing device) stores a plurality of different window functions corresponding to the kernel p(n), and the operator 426 selects one of the plurality of window functions and generates peak-reduced signal by using a peak canceling signal obtained by multiplying a cyclic kernel p(nsft) (an example of a "kernel cyclically shifted by the cyclic shift device") by the selected window function to the signal stream x(n). Thereby, in the signal processing device 2 of the second embodiment, the operator 426 can select the window function w2(n) if the amplitude of the cyclic kernel p(nsft) disappears in the state of the signal stream x(n), for example, if there is multiplication by window function w(n).

Also, in the signal processing device 2 of the second embodiment, the operator 426 selects one of the plurality of window functions on the basis of a sample number psn of a peak signal x(psn) (an example of the "position of the peak power") in the signal stream x(n) found by the peak determination device 420. Thereby, in the signal processing device 2 of the second embodiment, the operator 426 can select the window function w2(n) having a low amplitude attenuation rate in a corresponding portion and reduce the amplitude of the peak signal x(psn) of the signal stream x(n) if the sample number psn of the peak signal x(psn) has reached a portion having a high amplitude attenuation rate of the window function w(n) (first half and latter half portions of the signal).

Although the operator 426 selects one of the plurality of window functions on the basis of the sample number psn in the example of the second embodiment, the present invention is not limited to thereto. The operator 426 may alternately use a plurality of window functions or may select the window function in accordance with amplitude values at the first half and the latter half portions of the signal stream.

Third Embodiment

Next, the third embodiment will be described. In the following description, components which are the same as those of the first embodiment are denoted by the same reference signs, and description thereof will be omitted. In the third embodiment, a kernel storing device 424-1 stores a plurality of kernels (for example, p(n), p2(n), . . . ) with frequency components different from one another. Also, a storing device 424 stores the sample number psn of the peak signal x(psn) of the signal stream x(n).

Also, in the third embodiment, a cyclic shift device 425 selects one kernel (for example, p2(n)) among the plurality of kernels stored in the kernel storing device 424-1. The cyclic shift device 425 cyclically shifts the selected kernel on the basis of the position of the peak power in the signal stream found by the peak determination device 420.

Figure 11:
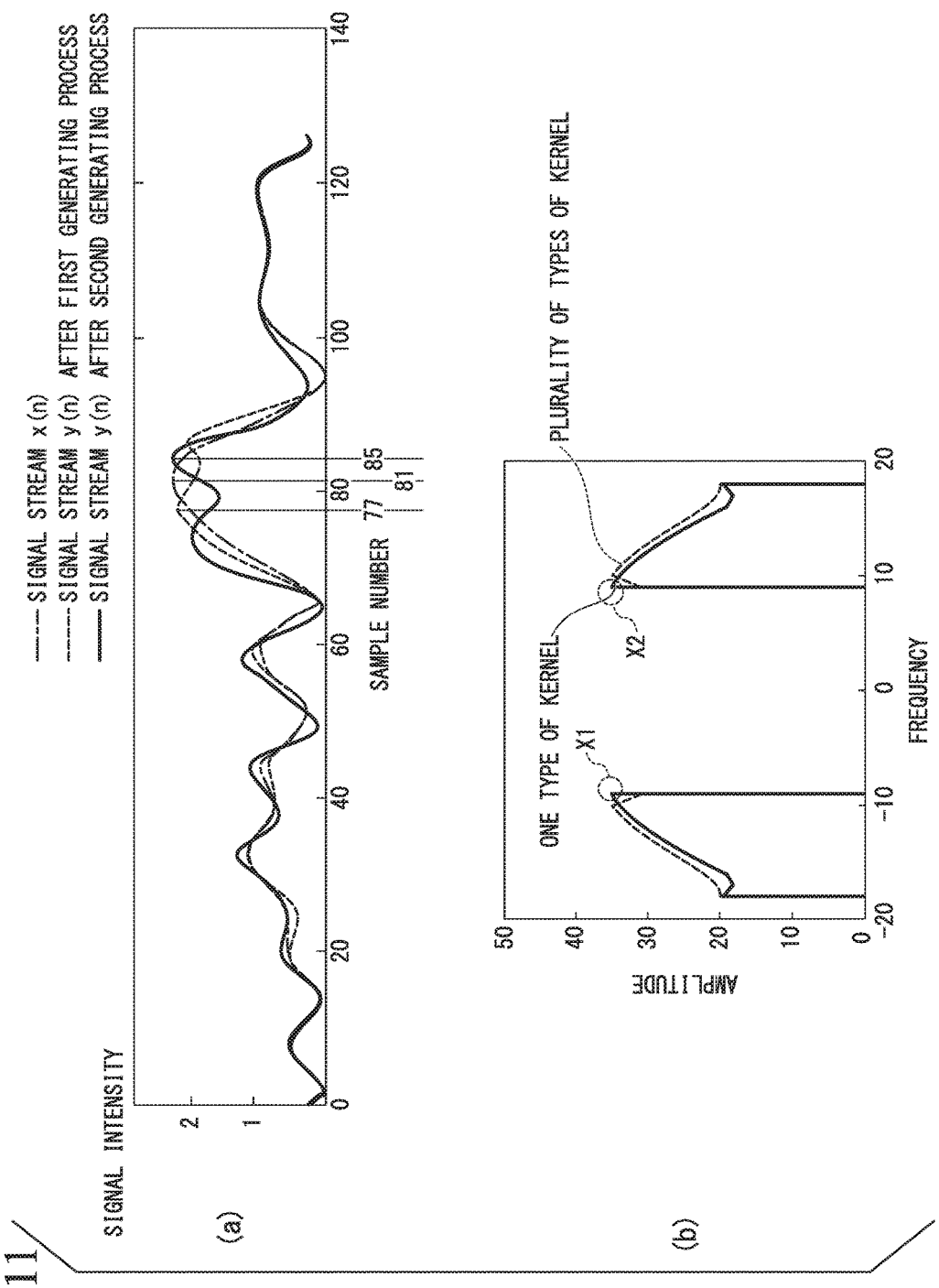
FIG. 11 is a diagram illustrating a third embodiment.

Here, a process of selecting a kernel performed by the cyclic shift device 425 will be described with reference to FIG. 11. FIG. 11 is a diagram illustrating a relationship between a generating process and a frequency. FIG. 11(a) illustrates an example of each of a signal stream x(n), a signal stream y(n) obtained through a first generating process, and a signal stream y(n) obtained through a second generating process. In FIG. 11(a), the horizontal axis represents a sample number and the vertical axis represents an absolute value of signal amplitude. FIG. 11(b) illustrates an example of frequency characteristics when kernels are summed. In FIG. 11(b), the horizontal axis represents a frequency and the vertical axis represents an absolute value of signal amplitude.

As illustrated in FIG. 11(a), sample numbers of the peak signals of the signal stream x(n), the signal stream y(n) obtained through the first generating process and the signal stream y(n) obtained through the second generating process are 81, 85, and 77, respectively. In this case, the cyclic shift device 425 generates cyclic kernels whose maximum amplitude positions are the sample numbers 81, 85, and 77 and uses the generated cyclic kernels corresponding signal streams. That is, a cyclic kernel having a specific frequency is used a range of a part of the signal stream x(n) (a range of sample numbers 77 to 85). In this manner, if the same cyclic kernel is used the same part of the signal stream x(n) many times, sharpening of the frequency characteristics due to in-phase addition described below with reference to FIG. 11(b) may occur.

FIG. 11(b) illustrates frequency characteristics when shift amounts of 1 to 8 are randomly selected and 16 cyclic kernels cyclically shifted with the selected shift amounts are summed. From the principle of a Fourier transform, the amount of shift in the time domain is phase rotation in the frequency domain. The amount of phase rotation krd of a sample of the frequency fk with respect to the amount of shift s is expressed by the following Equation (4). Here, N denotes the total number of samples of the signal stream, s denotes an amount of shift, and fk denotes a frequency.

$$krd = (2\pi/N \times s \times fk) \qquad (4)$$

As shown in the above-described Equation (4), if amounts of shift s are, so to speak, similar numerical values between 1 and 8, amounts of phase rotation krd become similar values capable of being regarded as equivalent amounts of rotation when the frequency fk is small. That is, as illustrated in FIG. 11(b), in-phase addition occurs in bands close to the center frequency such as the frequency fk of 9 to 10 and the frequency fk of −10 to −9, that is, in a band close to the modulated signal SIG-1 (an information signal) and portions in which the amplitude increases (sharpened portions X1 and X2) may occur. It may be difficult to reject a frequency component close to the information signal by the BPF device 7. Thus, it is desirable that the sharpened portions X1 and X2 illustrated in FIG. 11(b) have flat characteristics.

Thus, in the third embodiment, the peak determination device 420 acquires a sample number psn1 (an example of a "first peak position") of a peak signal x(psn1) of a signal stream x(n), outputs the acquired sample number psn1 to the cyclic shift device 425, and stores the acquired sample number psn1 in the storing device 424.

Also, the peak determination device 420 acquires a sample number psn2 (an example of a "second peak position") of a peak signal y(psn2) of a signal stream y(n) obtained by performing a first generating process on the signal stream x(n), outputs the acquired sample number psn2 to the cyclic shift device 425, and stores the acquired sample number psn2 in the storing device 424.

The cyclic shift device 425 selects one of a plurality of kernels on the basis of the sample number psn2 from the peak determination device 420 and the sample number psn1 stored in the storing device 424. For example, if a difference between the sample number psn2 and the sample number psn1 is in a range of 3 samples, the cyclic shift device 425 uses a kernel p2(n) different from the kernel p(n) used for the signal stream x(n) in the signal stream y(n). The kernel p2(n) is, for example, a kernel in which the phase of the signal corresponding to the frequency ±9 is rotated by 180° with respect to the kernel p(n).

Also, in the third embodiment, as in the second embodiment, the storing device 424 may store a plurality of peak reduction coefficients α. In this case, the operator 426 selects the peak reduction coefficient α on the basis of the sample number psn2 from the peak determination device 420 and the sample number psn1 stored in the storing device 424.

As described above, in the signal processing device 2 of the third embodiment, the kernel storing device 424-1 (an example of the "storing device") stores a plurality of kernels having different frequency components, and the cyclic shift device 425 selects one of the plurality of kernels. Thereby, in the third embodiment, the signal processing device 2 can make the cyclic shift device 425 select different kernels and can make the frequency characteristics close to being flat even when a non-flat sharpened portion occurs in the frequency characteristics of the peak-reduced signals generated by using the same kernel.

Also, in the signal processing device 2 of the third embodiment, the peak determination device 420 determines the sample number psn2 of the peak signal y(psn2) (an example of a "position of peak power") in the signal stream y(n) obtained by the operator 426 performing the first generating process (an example of a signal stream after a peak-reduced signal is generated), the storing device 424 (an example of a "storing device") stores the sample number psn1 of the peak signal x(psn1) of the signal stream x(n) (an example of a "first peak position of the signal stream") and the sample number psn2 of the peak signal y(psn2) of the signal stream y(n) (an example of a "second peak position of the processed signal stream"), and the cyclic shift device 425 selects one of the plurality of kernels on the basis of a positional relationship between the sample number psn1 (an example of the "first peak position") and the sample number psn2 (an example of the "second peak position").

Thereby, in the signal processing device 2 of the third embodiment, the cyclic shift device 425 can select a kernel p2(n) different from the kernel p(n) used in the first generating process if positions of the sample number psn1 for which the first generating process is performed and the sample number psn2 for which the next second generating process is performed are relatively close. Thus, the cyclic shift device 425 can prevent the same kernel p(n) generated from the same frequency component from being used to adjacent portions of the signal stream many times. Accordingly, the cyclic shift device 425 can suppress sharpening of frequency characteristics of a signal stream after a peak canceling signal is used and make the characteristics close to being flat.

Also, in the signal processing device 2 according to the third embodiment, the cyclic shift device 425 alternately uses two kernels whose phases are rotated by 180° at a specific frequency, but the present invention is not limited thereto. For example, the cyclic shift device 425 may select one kernel from a plurality of kernels having frequency components different one another.

Fourth Embodiment

Figure 12:
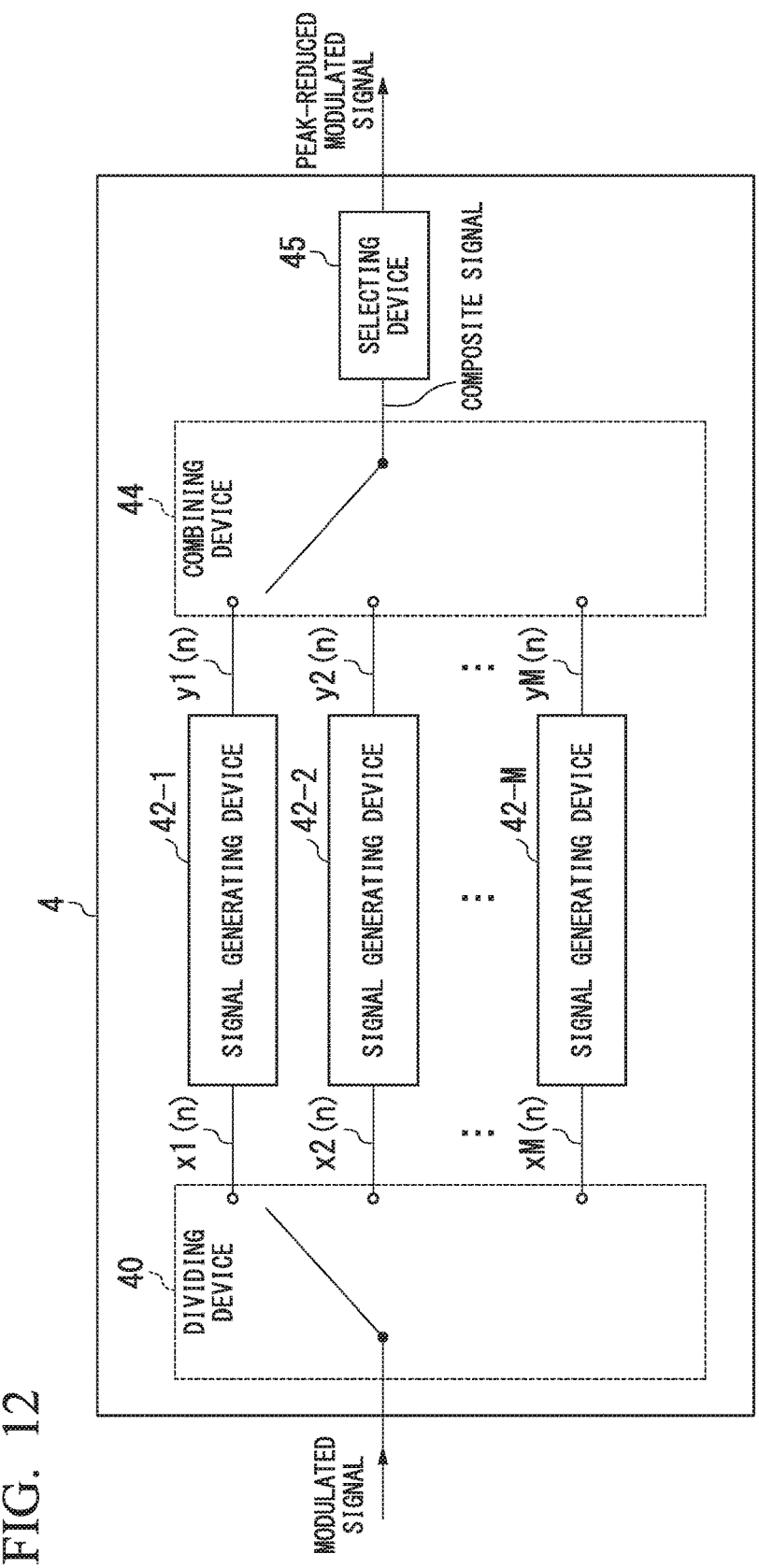
FIG. 12 is a configuration diagram of a signal generating unit according to a fourth embodiment.
Figure 13:
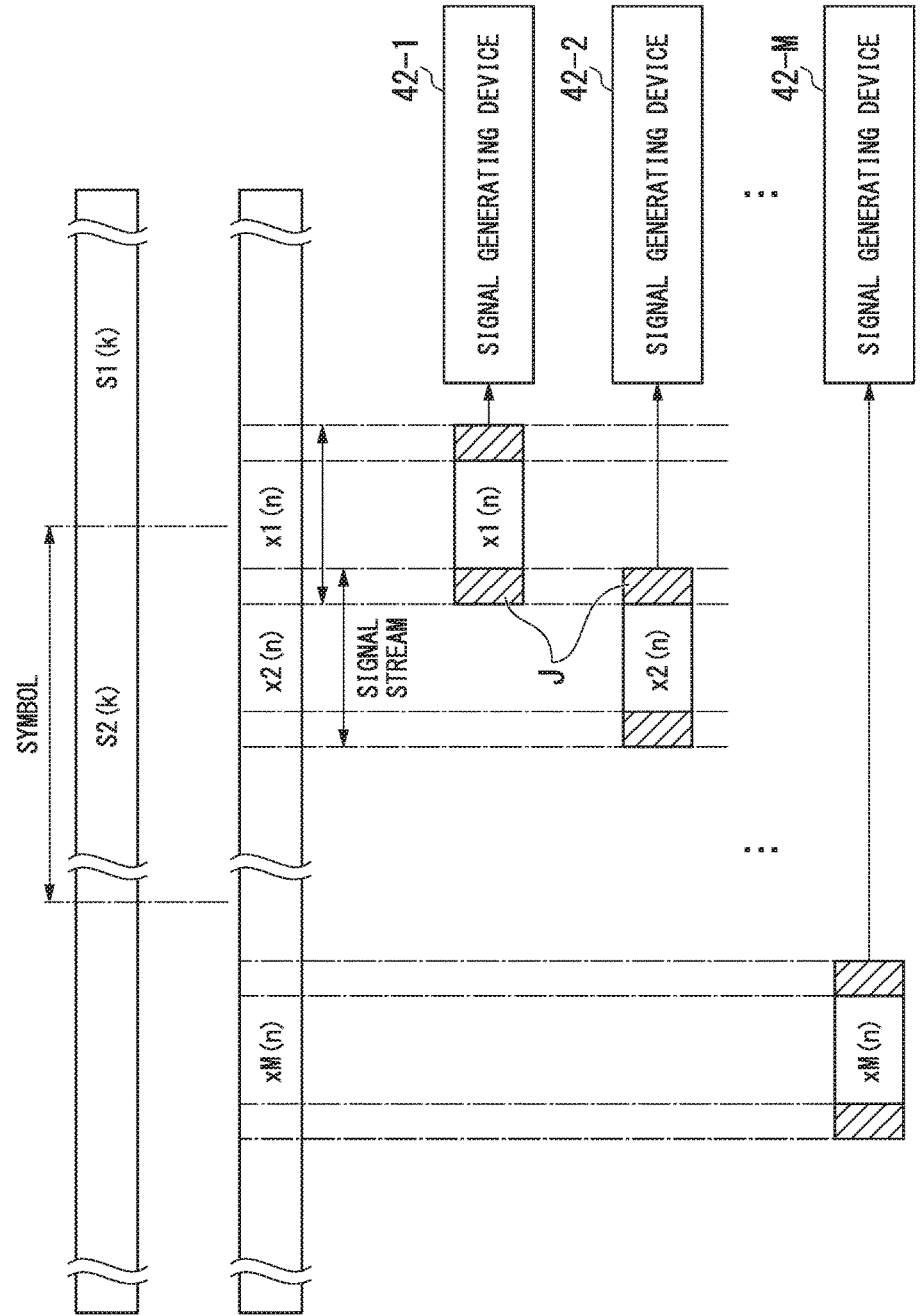
FIG. 13 is a diagram illustrating a signal stream according to the fourth embodiment.

Next, the fourth embodiment will be described with reference to FIGS. 12 and 13. FIG. 12 is a configuration diagram of a peak-reduced signal generating device 4 according to the fourth embodiment. In the following description, components which are the same as those of the first embodiment are denoted by the same reference signs and description thereof will be omitted. FIG. 13 is a diagram illustrating a signal stream according to the fourth embodiment. As illustrated in FIG. 12, in the fourth embodiment, the peak-reduced signal generating device 4 includes a selecting device 45.

As illustrated in FIG. 13, in the fourth embodiment, when a modulated signal SIG-1 is divided into signal streams x(n), a dividing device 40 of the peak-reduced signal generating device 4 divides the modulated signal SIG-1 so that a latter half portion Jx1 of a signal stream x1(n) overlaps a first half portion J2 of a signal stream x2(n). The dividing device 40 outputs mutually overlapping signal streams x1(n), x2(n), . . . , xM(n) to corresponding signal generating units 42-1, 42-2, . . . , 42-M.

Returning to FIG. 12, a signal generating unit 42 generates a peak-reduced signal by using peak canceling signal corresponding to the signal stream x(n) from the dividing device 40. Signal streams y1(n), y2(n), . . . , yM(n) output by the signal generating units 42-1, 42-2, . . . , 42-M have portions in which information components overlap each other as in a set of a latter half portion of y1(n) and a first half portion of y2(n) and a set of a latter half portion of y2(n) and a first half portion of y3(n), . . . . The combining device 44 combines the signal streams y1(n), y2(n), . . . , yM(n) output by the signal generating units 42-1, 42-2, . . . , 42-M in an order of y1(n), y2(n), . . . . A composite signal obtained through a combining process performed by the combining device 44 includes a portion in which information components overlap each other. The combining device 44 outputs the composite signal obtained through the combining process to the selecting device 45.

The selecting device 45 selects one of the overlapping portions included in the composite signal from the combining device 44. For example, the selecting device 45 acquires a peak signal y1(n1) of a latter half portion of the signal stream y1(n). Here, n1 is a natural number of 129-L to 128, and L is a natural number of 1 to 128 indicating the number of overlapping signals. Also, the selecting device 45 acquires a peak signal y2(n2) of the first half portion of the signal stream y2(n). Here, n2 is a natural number of 1 to L. Then, the selecting device 45 compares amplitudes of the peak signals y1(n1) and y2(n2). Then, the selecting device 45 selects a portion having a lower amplitude in the peak signal, and deletes a portion having a higher amplitude in the peak signal. The selecting device 45 eliminates the overlapping portion by deleting the portion. The selecting device 45 outputs a shortened waveform obtained by eliminating the overlapping portion as a peak-reduced modulated signal SIG-2.

For example, if the number of signals overlapping is denoted by L (L is a natural number of 1 to 128), the selecting device 45 compares amplitudes of peak signals of a latter half portion (y1(N−L+1) to y1(N)) of the signal stream y1(n) and a first half portion (y2(1) to y1(L)) of the signal stream y2(n) in the composite signal. For example, if the selecting device 45 selects the first half portion of the signal stream y2(n), the peak-reduced modulated signal SIG-2 output from the selecting device 45 is {y1(1), y1(2), . . . , y1(N−L), y2(1), y2(2), . . . , y2(L)}.

As described above, in the signal processing device 2 of the fourth embodiment, the peak-reduced signal generating device 4 divides the modulated signal SIG-1 so that a part of a latter half of a signal stream x1(n) (an example of a "first signal stream") and a part of a first half of a signal stream x2(n) (an example of a "second signal stream which is a signal stream after the first signal stream") overlap when the modulated signal SIG-1 (an example of an "input signal") is divided into signal streams x(n), and combines a signal stream y1(n) (an example of a "first output signal stream obtained by using the peak canceling signal to the first signal stream") and a signal stream y2(n) (an example of a "second output signal stream obtained by using the peak canceling signal to the second signal stream") on the basis of an order in which the division into the signal streams has been performed by selecting one of a part of a latter half in the signal stream y1(n) (an example of a "portion corresponding to a part of a latter half in the first output signal stream") and a part of a first half in the signal stream y2(n) (an example of a "portion corresponding to a part of a first half in the second output signal stream").

Thus, in the signal processing device 2 of the fourth embodiment, the peak-reduced signal generating device 4 can perform two types of generating process on overlapping portions, and select an overlapping portion having reduced amplitude in the peak signal from a result of performing the two types of generating process. Thus, in the signal processing device 2 of the fourth embodiment, even if a part of the first half or the latter half of the signal stream is not processed for some reason in the generating process, it is possible to select a part of another signal stream on which the generating process has been performed in place of the part which is not processed and more reliably use the peak canceling signal to the signal stream.

In the signal processing device 2 of the fourth embodiment, the peak-reduced signal generating device 4 selects one of a part of the latter half of the signal stream y1(n) and a part of the first half of the signal stream y2(n) so that the peak power of the modulated signal SIG-1 is reduced. Thereby, in the signal processing device 2 of the fourth embodiment, even if the amplitude of the peak signal is not sufficiently reduced in the generating process on a part of the first half or the latter half of the signal stream, it is possible to select a part of another signal stream on which the generating process has been performed in place of the part and generally reduce a PAPR of the modulated signal SIG-1.

Also, in the signal processing device 2 of the fourth embodiment, the peak-reduced signal generating device 4 compares a peak signal y1(n1) (an example of a "first signal in which an absolute value of amplitude is maximized in the portion corresponding to the part of the latter half in the first output signal stream") with a peak signal y2(n2) (an example of a "second signal in which an absolute value of amplitude is maximized in the portion corresponding to the part of the first half in the second output signal stream"), selects the portion corresponding to the part of the latter half in the signal stream y1(n) if the absolute value of the amplitude of the peak signal y1(n1) is greater than or equal to the absolute value of the amplitude of the peak signal y2(n2), and selects a portion corresponding to the part of the first half in the signal stream y2(n) if the absolute value of the amplitude of the peak signal y1(n1) is less than the absolute value of the amplitude of the peak signal y2(n2). Thereby, in the signal processing device 2 of the fourth embodiment, the peak-reduced signal generating device 4 can determine one of overlapping portions to be selected in a simple method of comparing peak signals of overlapping portions and reduce the PAPR of the modulated signal SIG-1 without increasing the processing load.

According to at least one embodiment described above, there are provided the peak-reduced signal generating device 4 configured to divide a modulated signal SIG-1 (an example of an "input signal having an information component") into signal streams x(n) for every number of samples N (an example of "every predetermined number of signals"), generate peak-reduced signal by using peak canceling signals to the signal streams x(n) obtained through the division, and combine signal streams y(n) to which the peak canceling signals are used on the basis of an order in which the division into the signal streams x(n) has been performed; and the BPF device 7 (an example of a "band pass filter") configured to pass a frequency band F(SIG-1) of the modulated signal SIG-1 (an example of a "frequency component corresponding to the information component") and reject frequency bands F(P1) and F(P2) (an example of a "frequency component corresponding to the peak canceling signal") with respect to an RF conversion signal SIG-3 (an example of a "signal based on a signal from the peak-reduced signal generating device") obtained by performing RF conversion on a peak-reduced modulated signal SIG-2 (an example of the "signal from the peak-reduced signal generating device"). Thereby, in the signal processing device 2 of the embodiment, a peak canceling signal can be used a signal stream of N samples obtained through the division. Because the number of samples N can be set irrespective of the total number of samples K corresponding to one symbol of the modulated signal SIG-1, it is possible to reduce the number of samples N even if the total number of samples K is large and reduce an amount of delay caused by one generating process. Also, a storage capacity for storing the signal stream can be reduced by reducing the number of samples N. Also, because it is possible not only to reduce the amount of delay caused by one application process but also to perform a plurality of generating processes in parallel if the signal processing device 2 includes a plurality of signal generating units 42, it is possible to perform the generating process on a plurality of signal streams with a slight amount of delay. Also, because the signal streams peak-reduced signals can be combined in the signal processing device 2, it is possible to generate a signal obtained by reducing the peak power of the modulated signal SIG-1 while keeping an information component included in the modulated signal SIG-1.

While several embodiments of the present invention have been described, these embodiments have been presented by way of example only, and are not intended to limit the scope of the invention. These embodiments may be embodied in a variety of other forms. Various omissions, substitutions and changes may be made without departing from the spirit of the invention. The invention described in the accompanying claims and its equivalents are intended to cover such embodiments or modifications as would fall within the scope and spirit of the invention.

EXPLANATION OF REFERENCES

1 Transmitter
2 Signal processing device
3 Modulating device
4 Peak-reduced signal generating device
5 RF converting device
6 PA device
7 BPF device
40 Dividing device
42-1 to 42-M Signal generating unit
44 Combining device
45 Selecting device
420 Peak determination device
424 Storing device
425 Cyclic shift device 426 Operator
424-1 Kernel storing device
424-2 Window function storing device

What is claimed is:

1. A signal processing device comprising:
a signal generator configured to:
divide an input signal that includes an information component in a preset frequency band into signal streams;
generate peak reduced signal streams, each peak reduced signal stream being generated by adding a respective peak canceling signal and a corresponding signal stream, each respective peak canceling signal being obtained by multiplying a cyclic kernel and a window function, the cyclic kernel being generated by shifting a position of a maximum value of a kernel to a peak position of a corresponding signal stream, the kernel having a frequency component corresponding to other than the preset frequency band, the window function being used to adjust the amplitude of the cyclic kernel; and
combine the peak reduced signal streams; and
a band pass filter configured to pass at least a frequency component corresponding to the preset frequency band and reject a frequency component corresponding to other than the preset frequency band at most.

2. The signal processing device according to claim 1, wherein the signal generator is configured to:
divide the input signal so that a part of a latter half of a first one of the signal streams overlaps a part of a first half of a second one of the signal streams, the second one of the signal streams following the first one of the signal streams;
add the first one of the signal streams and the peak canceling signal and add the second one of the signal streams and the peak canceling signal;
combine the added first one of the signal streams and the added second one of the signal streams;
select one that is either a first overlapped part of the added first one of the signal streams or a second overlapped part of the added second one of the signal streams; and
delete the other.

3. The signal processing device according to claim 2, wherein the signal generator is configured to select either the first overlapped part or the second overlapped part so that peak power of the combined peak reduced signal streams is reduced relative to peak power of the input signal.

4. The signal processing device according to claim 2, wherein the signal generator is configured to compare a first maximum value of the first overlapped part and a second maximum value of the second overlapped part, select the second overlapped part if the first maximum value is greater than or equal to the second maximum value, and select the first overlapped part if the first maximum value is less than the second maximum value.

5. The signal processing device according to claim 1,
wherein the input signal is a frequency multiplexed signal, and
wherein the signal generator is configured to divide the input signal into the signal streams at a timing when frequency multiplexed signals are not orthogonal to each other.

6. The signal processing device according to claim 1, wherein the signal generator is configured to:
store a plurality of different window functions, and
select one of the plurality of window functions and multiply the selected window function and the cyclic kernel.

7. The signal processing device according to claim 6, wherein the signal generator is configured to select one of the plurality of window functions based on the peak position of each of the signal streams.

8. The signal processing device according to claim 1, wherein the signal generator is configured to:
store a plurality of kernels having different frequency characteristics, and
select one of the plurality of kernels.

9. The signal processing device according to claim 8, wherein the signal generator is configured to:
determine a first peak position of each of the signal streams and a second peak position of each of the peak reduced signal streams,
store the first peak position and the second peak position, and
select one of the plurality of kernels which is different from one of the plurality of kernels added on each of the signal streams, if a difference between the first peak position and the second peak position is in a threshold range.

* * * * *